US011894011B2

(12) United States Patent
McCallum

(10) Patent No.: US 11,894,011 B2
(45) Date of Patent: *Feb. 6, 2024

(54) METHODS AND APPARATUS TO REDUCE NOISE FROM HARMONIC NOISE SOURCES

(71) Applicant: The Nielsen Company (US), LLC, New York, NY (US)

(72) Inventor: Matthew McCallum, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,014

(22) Filed: Jan. 9, 2023

(65) Prior Publication Data

US 2023/0162753 A1 May 25, 2023

Related U.S. Application Data

(63) Continuation of application No. 17/328,984, filed on May 24, 2021, now Pat. No. 11,557,309, which is a (Continued)

(51) Int. Cl.

*G10L 21/0232* (2013.01)
*G10L 21/0264* (2013.01)
*G10L 19/018* (2013.01)

(52) U.S. Cl.

CPC ........ *G10L 21/0232* (2013.01); *G10L 19/018* (2013.01); *G10L 21/0264* (2013.01)

(58) Field of Classification Search

CPC ............... G10L 21/0232; G10L 19/018; G10L 21/0264

(Continued)

(56) References Cited

U.S. PATENT DOCUMENTS 6,330,673 B1 12/2001 Levine
8,049,093 B2 11/2011 Jeon et al.

(Continued)

FOREIGN PATENT DOCUMENTS

EP 1450354 A1 8/2004
EP 3477642 A1 5/2019

(Continued)

OTHER PUBLICATIONS

European Patent Office, "Extended European Search Report" issued in connection with European Application No. 18201989.3, dated Apr. 3, 2019, 5 pages.

(Continued)

*Primary Examiner* — Yosef K Laekemariam

(74) *Attorney, Agent, or Firm* — McDonnell Boehnen Hulbert & Berghoff LLP

(57) ABSTRACT

Methods, apparatus, systems and articles of manufacture are disclosed to reduce noise from harmonic noise sources. An example apparatus includes at least one memory; at least one processor to execute the computer readable instructions to at least: determine a first amplitude value of a frequency component in a frequency spectrum of an audio sample; determine a set of points in the frequency spectrum having at least one of (a) amplitude values within an amplitude threshold of the first amplitude value, (b) frequency values within a frequency threshold of the first amplitude value, or (c) phase values within a phase threshold of the first amplitude value; increment a counter when a distance between (1) a second amplitude value in the set of points and (2) the first amplitude value satisfies a distance threshold; and when the counter satisfies a counter threshold, generate a contour trace based on the set of points.

20 Claims, 16 Drawing Sheets

Related U.S. Application Data continuation of application No. 16/939,985, filed on Jul. 27, 2020, now Pat. No. 11,017,797, which is a continuation of application No. 16/298,633, filed on Mar. 11, 2019, now Pat. No. 10,726,860, which is a continuation of application No. 15/794,870, filed on Oct. 26, 2017, now Pat. No. 10,249,319.

(58) Field of Classification Search
USPC ........ 381/94.1, 94.2, 94.3, 94.5, 71.1, 71.14
See application file for complete search history.

(56) References Cited

U.S. PATENT DOCUMENTS

| | | | |
|---|---|---|---|
| 8,452,586 B2 | 5/2013 | Master et al. | |
| 8,700,407 B2 | 4/2014 | Wang et al. | |
| 10,249,319 B1 | 4/2019 | McCallum | |
| 10,726,860 B2 | 7/2020 | McCallum | |
| 11,017,797 B2 | 5/2021 | McCallum | |
| 2007/0027678 A1 | 2/2007 | Hotho et al. | |
| 2008/0219472 A1 | 9/2008 | Chhatwal et al. | |
| 2013/0282372 A1 | 10/2013 | Visser et al. | |
| 2014/0350927 A1 | 11/2014 | Yamabe et al. | |
| 2015/0162014 A1 | 6/2015 | Zhang et al. | |
| 2016/0118039 A1 * | 4/2016 | Moon | G10L 15/08 704/239 |
| 2016/0247512 A1 | 8/2016 | Duong et al. | |
| 2020/0357424 A1 | 11/2020 | McCallum | |

FOREIGN PATENT DOCUMENTS

| | | | |
|---|---|---|---|
| JP | 2010-154092 A | 7/2010 | |
| JP | 2013-171130 A | 9/2013 | |
| JP | 2013171130 * | 9/2013 | G10L 21/0232 |
| WO | 0113364 A1 | 2/2001 | |

OTHER PUBLICATIONS

United States Patent and Trademark Office, "Non-Final Office Action," issued in connection with U.S. Appl. No. 15/794,870, dated Jun. 1, 2018, 6 pages.
United States Patent and Trademark Office, "Notice of Allowance," issued in connection with U.S. Appl. No. 15/794,870, dated Nov. 9, 2018, 7 pages.
Kim et al., "Robust audio fingerprinting using peak-pair-based hash of non-repeating foreground audio in a real Environment", Cluster Computing, vol. 19, No. 1, published online Jan. 2, 2016, 9 pages.
Han et al., "Blind Source Separation for a Robust Audio Recognition Scheme in Multiple Sound-Sources Environment," International Conference on Mechatronics, Electronic, Industrial and Control Engineering, Spectrum, vol. 1, 2015, 5 pages.
McCallum et al., "Accounting for deterministic noise components in a MMSE STSA speech enhancement framework," 2012 International Symposium on Communications and Information Technologies (ISCIT), IEEE, 2012, 6 pages.
Bittner, et al., "Melody Extraction by Contour Classification," 16th International Society for Music Information Retrieval :;onference, ISMIR, 2015, 7 pages.
Salamon et al., "Melody Extraction from Polyphonic Music Signals using Pitch Contour Characteristics," IEEE Transactions on Audio, Speech, and Language Processing, vol. 20, No. 6, 2012, 12 pages.
McCallum, "Foreground Harmonic Noise Reduction for Robust Audio Fingerprinting", IEEE International Conference )n Acoustics, Speech and Signal Processing (ICASSP), 2018, 5 pages.
Yang et al., "BaNa: A Noise Resilient Fundamental Frequency Detection Algorithm for Speech and Music," IEEE, Aug. 27, 2014, 16 pages.
Wang, "An Industrial-Strength Audio Search Algorithm," Shazam Entertainment, Ltd., 2003, 7 pages.
Gonzalez et al., "A Pitch Estimation Filter Robust to High Levels of Noise (PEFAC)," 19th European Signal Processing :;onference (EUSIPCO 2011 ), Barcelona, Spain, Aug. 29-Sep. 2, 2011, pp. 451-455, 5 pages.
Gomez et al., "Predominant Fundamental Frequency Estimation VS Singing Voice Separation for the Automatic Transcription of Accompanied Flamenco Singing," International Society for Music Information Retrieval, 2012, [http://NWW.mtg.upf.edu/system/files/publication/MTGUJA-ISMIR2012.pdf], 6 pages.
Duan, "Topic 4: Single Pitch Detection," ECE 477, Computer Audition, 2015, 24 pages.
Japanese Patent Office, "Notice of Reasons for Rejection," issued in connection with Japanese Patent Application No. 2018-199320, with English translation, dated Jan. 7, 2020, 4 pages.
United States Patent and Trademark Office, "Non-Final Office Action," issued in connection with U.S. Appl. No. 16/298,633, dated Aug. 29, 2019, 7 pages.
United States Patent and Trademark Office, "Notice of Allowance," issued in connection with U.S. Appl. No. 16/298,633, dated Mar. 16, 2020, 7 pages.
Japanese Patent Office, "Notice of Allowance," issued in connection with Japanese Patent Application No. 2018-199320, dated Jun. 30, 2020, 3 pages.
United States Patent and Trademark Office, "Non-Final Office Action," issued in connection with U.S. Appl. No. 16/939,985, dated Sep. 10, 2020, 8 pages.
United States Patent and Trademark Office, "Notice of Allowance," issued in connection with U.S. Appl. No. 16/939,985, dated Jan. 27, 2021, 7 pages.
European Patent Office, "Communication pursuant to Article 94(3) EPC," issued in connection with European Application No. 18201989.3, dated May 26, 2021, 3 pages.
Japanese Patent Office, "Notice of Reasons for Rejection," issued in connection with Japanese Patent Application No. 2020-128283, with English translation, dated Jun. 1, 2021, 6 pages.
Japanese Patent Office, "Decision to Grant a Patent," issued in connection with Japanese Patent Application No. 2020-128283, dated Dec. 9, 2021, 5 pages.
Wilson et al., "Speech Denoising Using Nonnegative Matrix Factorization With Priors," 2008 IEEE Intemational Conference on Acoustics, Speech and Signal Processing, 4 pages.
Japanese Patent Office, "Search Report," issued in connection with Japanese Patent Application No. 2018-199320, dated Nov. 13, 2019, 11 pages.
The Institute of Electronics, Information and Communication Engineers (IEICE), "IEICE Technical Committee Submission System Conference Paper's Information," ken-system: Recognizing warning sounds using the harmonic structure and peak emphasis, dated Mar. 9, 2012, 8 pages. [retrieved from: https://www.ieice.org/ken/ : paper/2012030970oy/eng/].

* cited by examiner

900

1400

1500

METHODS AND APPARATUS TO REDUCE NOISE FROM HARMONIC NOISE SOURCES

RELATED APPLICATIONS

This patent arises from a continuation of U.S. patent application Ser. No. 17/328,984, entitled METHODS AND APPARATUS TO REDUCE NOISE FROM HARMONIC NOISE SOURCES, filed May 24, 2021, which is a continuation of U.S. patent application Ser. No. 16/939,985, entitled, "METHODS AND APPARATUS TO REDUCE NOISE FROM HARMONIC NOISE SOURCES," now U.S. Pat. No. 11,017,797, filed Jul. 27, 2020, which is a continuation of U.S. patent application Ser. No. 16/298,633, entitled, "METHODS AND APPARATUS TO REDUCE NOISE FROM HARMONIC NOISE SOURCES," now U.S. Pat. No. 10,726,860, filed Mar. 11, 2019, which is a continuation of U.S. patent application Ser. No. 15/794,870, entitled, "METHODS AND APPARATUS TO REDUCE NOISE FROM HARMONIC NOISE SOURCES," now U.S. Pat. No. 10,249,319, filed Oct. 26, 2017. U.S. patent application Ser. No. 15/794,870, U.S. patent application Ser. No. 16/298,633, and U.S. patent application Ser. No. 16/939,985 are hereby incorporated herein by reference in their entirety. Priority to U.S. patent application Ser. No. 15/794,870, U.S. patent application Ser. No. 16/298,633, U.S. patent application Ser. No. 16/939,985 is hereby claimed.

FIELD OF THE DISCLOSURE

This disclosure relates generally to signal processing, and, more particularly, to methods and apparatus to reduce noise from harmonic noise sources.

BACKGROUND

Mobile recording of audio has become widespread. Mobile recordings of events, such as concerts, are recorded via a microphone on a mobile device and may be used for subsequent identification of the media presented in the recording by using a media recognition platform, such as MusicID®.

Figure 1:
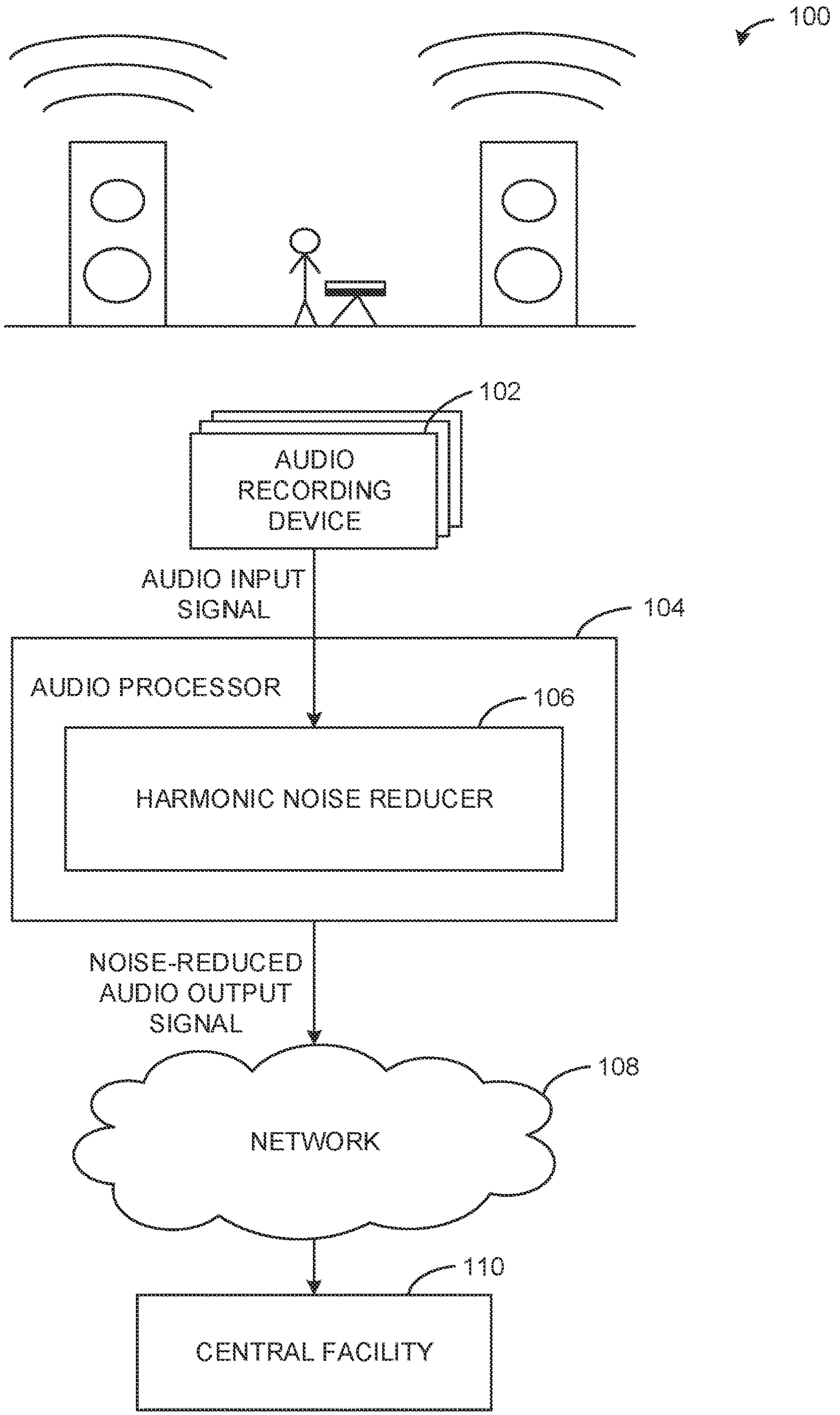
FIG. 1 is a schematic illustration of an audio recording and processing system in which audio is recorded from a live setting, processed, and provided to a central facility.

The figures are not to scale.

DETAILED DESCRIPTION

In recent years, the increased popularity of mobile devices has enabled individuals to easily record audio at any time. For example, many individuals choose to use a mobile device to record audio at concerts or other entertainment events. The audio recorded at these events can be useful to media measurement entities that are interested in determining the media being presented to the individual on the basis of the audio recordings.

Conventionally, media measurement entities may utilize watermarking to identify media. In such cases, one or more audio codes may be embedded in the media representing identifying information (e.g., a title, artist, album, etc.) for the media. Additionally or alternatively, if a watermark or similar code is not embedded in the media, a fingerprint or signature-based media monitoring technique may be used. A signature uses one or more inherent characteristics of the monitored media during a monitoring time interval to generate a substantially unique proxy for the media. This signature may take any form (e.g., a series of digital values, a wavefrom, etc.) representative of any aspect(s) of the media signal(s). As used herein, the term audio signal and/or audio sample refers to data representing sound. Audio signatures are sometimes generated in a manner that focuses on specific aspects that are easy to identify, such as features of the audio sample that have large amplitude. Minor noise, such as a constant background noise of a distant crowd, traffic, or wind, for example, has relatively little effect on audio signatures, which focus on large amplitude features, as minor noise imparts only a low-amplitude signal. However, other types of noise, such as a nearby conversation, can have a significant effect on the precision with which an audio signature can be generated to adequately represent the media. Further, speech often has substantial harmonic components that may interfere with the narrowband, tonal and large-amplitude features used in audio signature generation. Both these interfering features and the desired audio sample parameters that contribute to the creation of a signature are not significantly affected by traditional noise-reduction techniques, which typically focus on the aforementioned low-amplitude noise in areas with a low local signal to noise ratio. Thus, audio recorded in a setting having a live audience or a significant source of noise may be difficult or impossible to use for generation of reliable audio signatures.

Conventional techniques for the reduction of noise or undesired recorded sound do not specifically address the aspects of an audio sample that are most critical for the generation of an audio signature.

Example methods, apparatus, systems and articles of manufacture disclosed herein reference techniques to reduce noise that has harmonic components. For example, these techniques may be utilized to reduce the effect of voices from an audio recording at a concert. In some examples, the example methods, apparatus, systems and articles of manufacture disclosed herein enable noise reduction of the recorded audio sample and the generation of an audio signature from the noise-reduced audio to take place at the mobile device. In some examples, the noise reduction of the audio sample takes place at the central processing facility, at which the audio signature generation also occurs. In other examples, the techniques may be implemented at any other step or in any other context to reduce the effect of noise from an audio sample. In some examples and configurations, the techniques may be used to reduce noise for the production of a clearer audio recording, in addition or alternative to performing the noise reduction for signature generation.

FIG. 1 is a schematic illustration of an example system constructed in accordance with the teachings of this disclosure for reducing harmonic noise from audio samples. The example system 100 of FIG. 1 includes audio recording device(s) 102 that record audio samples and transmit the audio samples to an audio processor 104. The audio processor 104 additionally includes a harmonic noise reducer 106, which enhances the audio sample. The audio processor 104 then forwards the noise-reduced audio signal to a network 108, which communicates the audio signal to, for example, a central facility 110, where further processing or utilization of the audio signal may occur.

The example audio recording device 102 of the illustrated example of FIG. 1 is a device that captures audio and generates a digital audio signal representing the audio exposed to the microphone. There may be any number of audio recording devices 102 recording the audio at any time. In some examples, any of the audio recording devices 102 may be analog devices, from which a digital signal based upon the recorded audio is later generated. In some examples, the audio recording device 102 may be a part of another mobile device, such as a mobile phone. In other examples, the audio recording device 102 may be a standalone device with the primary purpose of the device being audio recording. In some examples, the audio recording device 102 may not be a mobile device, and may be a permanent professional audio recording equipment configuration. The example audio recording device 102 communicates with the audio processor 104 in order to perform processing of the audio that is recorded on the audio recording device 102. In some examples, the audio processor 104 may be a component of the same mobile device as the audio recording device 102. In other examples, the recorded audio may be transmitted to another device or facility via a network, such as the network 108, or in some examples via a physical hardware connection (e.g., Ethernet, serial ATA, USB, etc.) or other method. In some such examples, the audience at a live event may carry the audio recording devices 102 and communicate the recorded audio signals via the network 108 to the audio processor 104.

The example audio processor 104 of the illustrated example of FIG. 1 is configured to perform the manipulation and alteration of audio samples. The example audio processor 104 may be a part of a mobile device, which may additionally include the audio recording device 102. In some examples, the audio processor 104 may be located on the same mobile device as the audio recording device 102, at the central facility 110, or at any other location. The audio processor 104 includes the harmonic noise reducer 106 which performs the harmonic noise reduction in accordance with the teachings of this disclosure. In some examples, the harmonic noise reducer 106 may be multiple components as opposed to a single component. In some examples, the audio processor 104 additionally includes functionality to implement equalization, compression, standard noise reduction, filtering, or any other audio processing technique.

The example harmonic noise reducer 106 of the illustrated example of FIG. 1 is a component capable of reducing harmonic noise from an audio sample. The example harmonic noise reducer 106 receives an audio input signal and performs noise reduction on the signal to generate a noise-reduced output signal. The harmonic noise reducer 106 is configured to be capable of converting an audio sample from the time domain to the frequency domain such as via a Fourier transform, as well as perform the same operation in reverse, such as via an inverse Fourier transform. The example harmonic noise reducer 106 is configured to determine a point of comparatively large amplitude at a representative number of frequency values, and generate contours representing localized large-amplitude signals pertaining to some, or all of the points of large amplitude that are determined. For example, the point of comparatively large amplitude may be the largest amplitude point within a specific frequency band. As used herein, the points representative of comparatively large amplitudes are additionally referred to as peaks. The harmonic noise reducer 106 is further configured to propagate the contour identification of critical features of the audio sample to the related harmonics for some or all of the contours. The example harmonic noise reducer 106 may, in the process of determining the harmonic contours, determine a base frequency at which a signal was recorded, and analyze the relevant contours at a specified number of the harmonic frequencies based on this base frequency. The example harmonic noise reducer 106 is additionally or alternatively configured to determine parameters of the audio samples and the determined contours. In some examples, the parameters that the example harmonic noise reducer 106 can determine include, for example, the phase coherence of a contour, the average and maximum amplitude over individual contours, the standard deviation of amplitude parameters for the contours, the percentage of pitch movement in each contour, the maximum and average amplitudes in the audio sample and in the set of contours, and any other audio sample parameters. The example harmonic noise reducer 106 is further capable of determining a contour to be an outlier on the basis of the determined parameters. The example harmonic noise reducer 106 is configured to subtract the portion of the audio sample determined to represent an outlier from the audio sample. The subtraction can occur either in the time domain or with a magnitude or complex frequency domain representation. Thereafter, the example harmonic noise reducer 106 synthesizes the audio sample to generate the noise-reduced audio sample in the time domain. The example harmonic noise reducer 106 may be implemented via hardware, firmware, software or any combination thereof.

The example network 108 of the illustrated example of FIG. 1 is the Internet. The network 108 serves as a communication medium for the noise-reduced audio output signal, audio signatures generated based on the noise-reduced audio output signal, and any other data generated, processed or transmitted by the audio processor 104. In some examples, the network 108 communicates an audio signature that is generated at a mobile device that includes the audio recording device 102 and the audio processor 104 to the central facility 110. Additionally or alternatively, any other network communicatively linking the audio processor 104 and the central facility 110. In some examples, the network 108 may link any other additional or alternative elements, such as linking the audio processor 104, the central facility 110, and the audio recording device 102. In some examples, the network 108 is a combination of other, smaller networks, all of which can be either public or private. Elements are referred to as communicatively linked if they are in direct or indirect communication through one or more intermediary components and do not require direct physical (e.g., wired) communication and/or constant communication, but rather include selective communication at periodic or aperiodic intervals, as well as one-time events.

The example central facility 110 receives and utilizes the noise-reduced audio sample and/or the audio signature generated based upon the noise reduced audio sample. In some examples, the central facility 110 is an audience measurement entity (e.g., The Nielsen Company (US) LLC) and/or automatic content recognition service provider (e.g., Gracenote, Inc.). In some examples, the tasks (e.g., generation of audio signatures) executed by the central facility 110 may occur at one physical facility. In some examples, these tasks may occur at multiple facilities. In some example systems, the generation of audio signatures may instead take place at the audio processor 104, which may be incorporated into a mobile device and may additionally include the audio recording device 102. These elements may be utilized in any combination or order.

In operation, the audio recording device 102 records audio and transmits the audio signal in a digital format to the audio processor 104. The audio processor 104 processes the audio signals, including processing by the harmonic noise reducer 106 to reduce harmonic noise from the signal. Subsequently, the noise-reduced audio signal and/or an audio signature generated based upon the noise-reduced audio signal is transmitted via the network 108 to the central facility 110.

Figure 2:
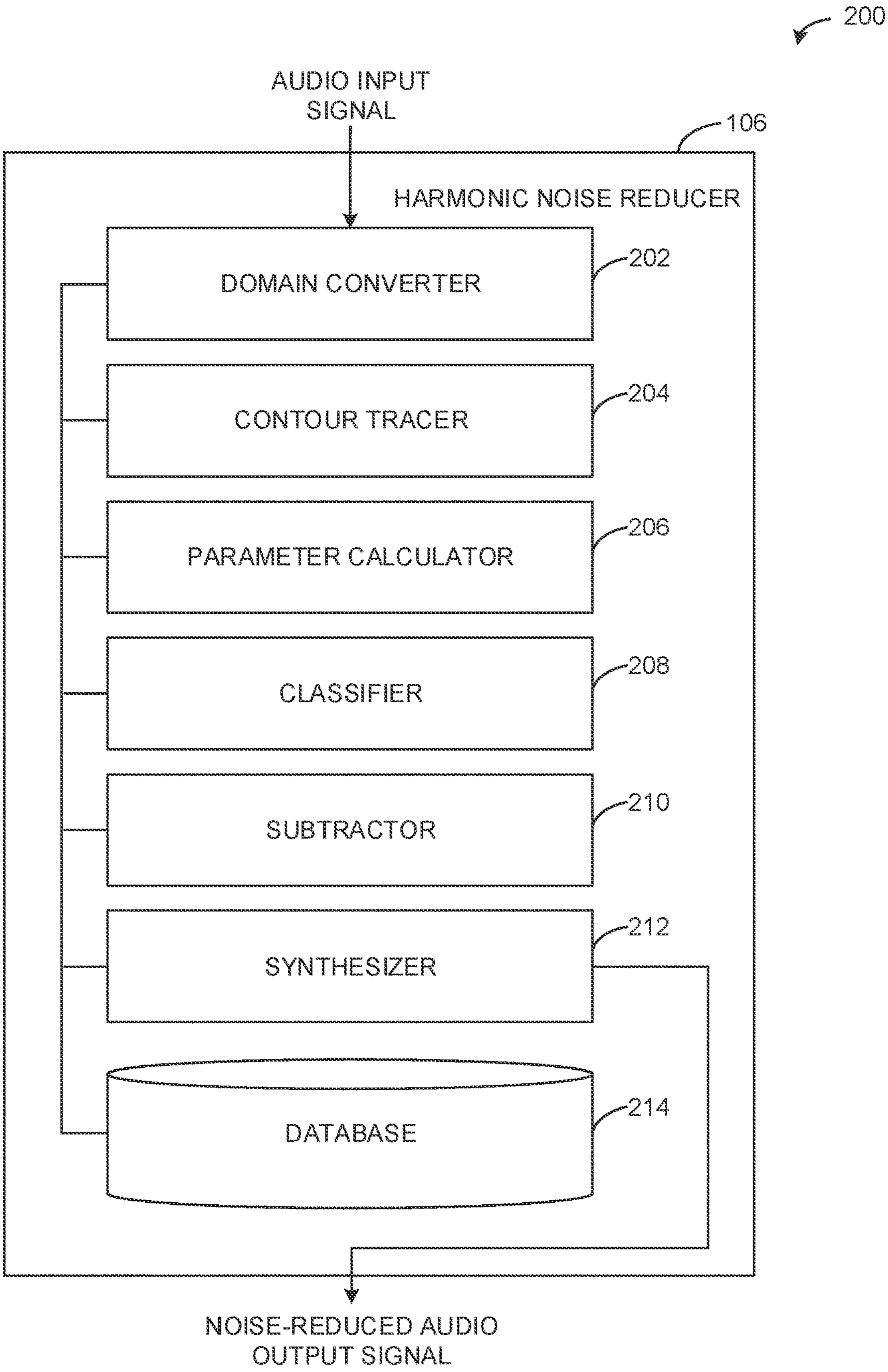
FIG. 2 is a block diagram showing additional detail of the harmonic noise reducer of FIG. 1.

A block diagram providing additional detail of an example implementation of the harmonic noise reducer 106 is illustrated in FIG. 2. The example harmonic noise reducer 106 is capable of receiving an audio sample (e.g. a discrete signal) and processing the audio sample to reduce noise, including harmonic noise. For example, the harmonic noise reducer 106 may reduce the effect of a nearby conversation on an audio recording of a song at a concert or other casual venue. Following the harmonic noise reduction process, the harmonic noise reducer 106 may communicate the noise-reduced audio signal to another component of the audio processor 104 to generate an audio signature.

As shown in FIG. 2, the illustrated example harmonic noise reducer 106 contains a domain converter 202, a contour tracer 204, a parameter calculator 206, a classifier 208, a subtractor 210, and a synthesizer 212, each of which interact with the audio signal. In some examples, the audio signal is processed by these elements in succession. The illustrated example harmonic noise reducer 106 additionally includes a database 214.

The example domain converter 202 of the illustrated example of FIG. 2 performs steps to transfer the input audio signal to the frequency domain to perform analysis and processing of the audio signal. The example domain converter 202 resamples the audio signal at an appropriate sample rate to perform a short-time Fourier transform (STFT). For example, the audio signal may be resampled to an 8 kHz sample rate. In some examples, the resampling of the dataset may be performed using a function such as "resample" in MATLAB®. Any known manner of resampling that enables the audio signal to be converted to a sample size appropriate for a short-time Fourier transform may be used. The example domain converter 202 then converts the time-domain audio signal to the frequency domain by performing a short-time Fourier transform (STFT). The STFT may be described in accordance with equation (1) below:

$$X[k, m] = \sum_{n=mM}^{mM+N} x[n]w[n]e^{-\frac{i2\pi nk}{K}} \qquad \text{Equation (1)}$$

In the illustrated example of Equation (1) above, the variable M refers to the increment in samples between windows, the variable N refers to the windowing length, the variable K refers to the number of frequency bins in the discrete Fourier transform, the variable k refers to the frequency bin index, the variable n refers to the time index, x[n] refers to the recorded digital audio signal, w[n] refers to any windowing function, and X[k,m] refers to the resulting STFT.

Figure 7:
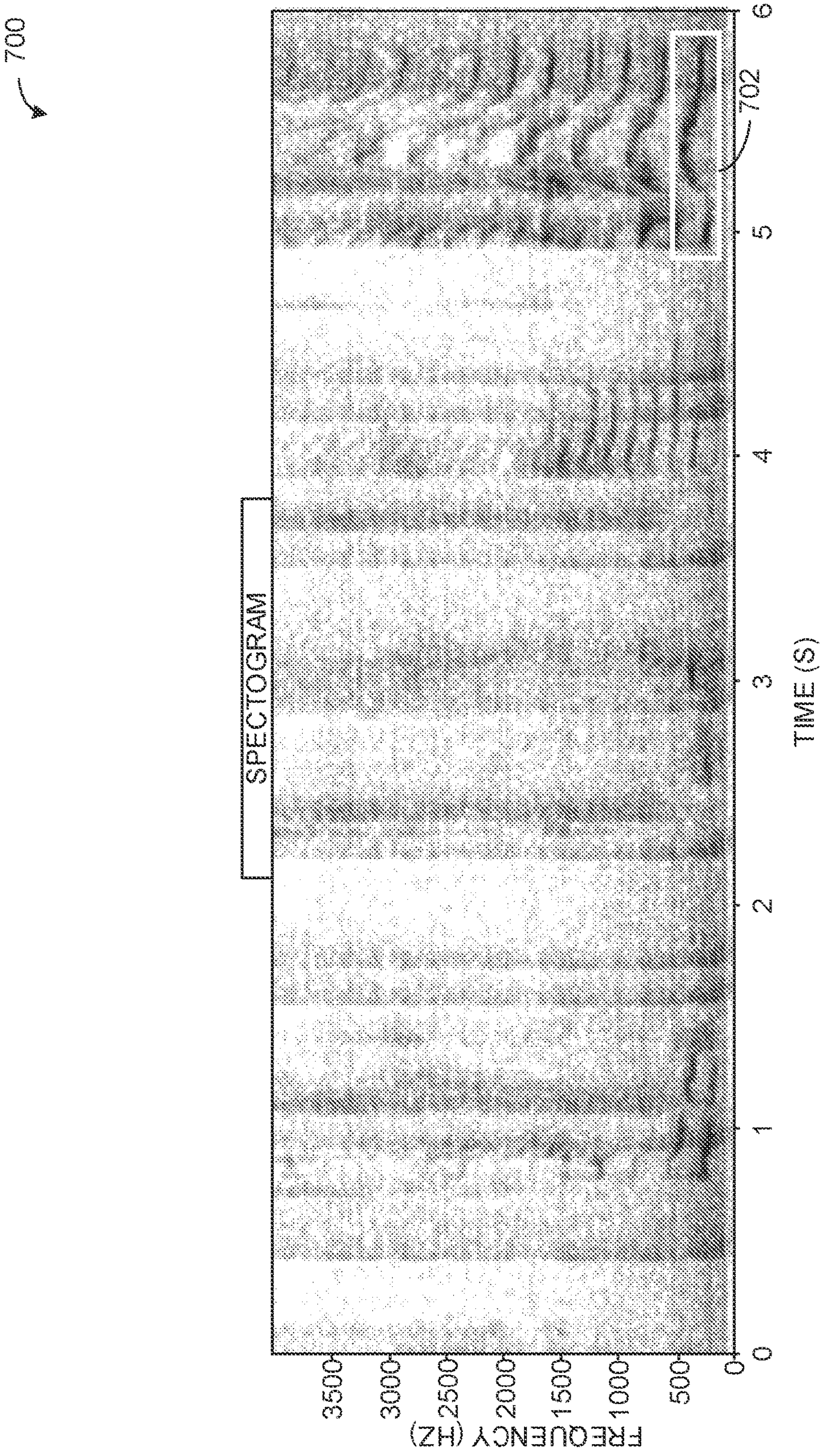
FIG. 7 is an example spectrogram of an audio signal after being processed by the domain converter of FIG. 2.

The example domain converter 202 performs the short-time Fourier transform with a hamming window function using a windowing length of 50 milliseconds. This windowing length of 50 milliseconds corresponds to 40 samples per window in the case where the example domain converter 202 resampled the input audio signal to an 8 kHz sample rate. In other examples, any other windowing function (e.g., a Hann window, a Gaussian window, etc.) may be utilized, with any other windowing length. The example domain converter 202 additionally performs the short-time Fourier transform with the time elapsed between windows set to 2 milliseconds, representing 400 samples at the example 8 kHz sample rate. The example domain converter 202 utilizes a Fast Fourier Transform (FFT) size of 1600. At the example 8 kHz sampling rate, this FFT rate represents a frequency spectral resolution of 5 Hz. In other examples, any time period elapsed between windows and any FFT size may be utilized. In some examples, any other type of transform to convert the input audio signal to the frequency domain for further processing may be used. Following the domain conversion by the domain converter 202, the audio signal can be represented in a spectrogram, as shown in FIG. 7. The spectrogram displays the audio signal frequency and time, with the amplitude of the audio signal represented by the darkness of the shading. For example, in region 702 on the spectrogram in the illustrated example of FIG. 7, the dark, curved line indicates a large-amplitude signal in the 300-500 Hz range from approximately 5-6 seconds. In some examples, the completed domain conversion, the intermediate processing and the output of the processing of the domain converter 202 is stored to the database 214. In other examples, these elements are stored to a temporary memory, or any other accessible memory.

The example contour tracer 204 of the illustrated example of FIG. 2 generates contours representative of large-amplitude segments of the signal in order for efficient, streamlined analysis of the signal's prominent features and determination of segments representing noise. The example contour tracer 204 determines parts of the signal at which to begin tracing a contour by determining the points of largest amplitude for the signal. In some examples, the contour tracer 204 determines the point of comparatively large amplitude at all frequencies of the signal, at a specified level of precision (e.g., for every 1 Hz). The contour tracer 204 therefore determines points of comparatively large amplitude for a representative number of frequency values in the audio sample. For example, the contour tracer 204 may determine the points of comparatively large amplitude (e.g., peaks) as shown in the instantaneous peaks plot of FIG. 8 for the signal represented by the spectrogram shown in the example of FIG. 7. In the illustrated example of an instantaneous peaks plot shown in FIG. 8, the region 802 appears dark due to a significant amount of comparatively large points (e.g., instantaneous peaks) in the region. The example spectrogram of FIG. 7 correspondingly shows a region of large-amplitude signal in region 702. The example contour tracer 204 further calculates a more precise peak frequency by calculating the phase difference between two consecutive STFT frames as described in accordance with Equation (2) below:

$$\omega_{k,m} = \frac{2\pi k}{K} \frac{\left(\angle X[k, m] - \angle X[k, m-1] - \frac{2\pi Mk}{K}\right)\text{mod}2\pi}{M} \quad \text{Equation (2)}$$

In the illustrated example of Equation (2) above, the variable $\omega_{k,m}$ refers to the precise peak frequency, the variable k refers to the frequency bin index of the original magnitude peak, the value K refers to the number of frequency bins in an STFT representation, $\angle(\cdot)$ refers to the argument of a complex number, m refers to the time window index in an STFT representation, M refers to the increment in samples between successive windows in the STFT, and X[k,m] refers to the complex STFT domain signal.

The contour tracer 204 additionally generates a more precise value of amplitude and phase in accordance with Equations (3) and (4) to obtain a dataset that could be located at a continuous range of frequency values as opposed to a discretized representation.

$$\phi_{k,m} = \angle X[k, m] + \angle W(\omega_{k,m}) \quad \text{Equation (3)}$$

$$A_{k,m} = \frac{|(X[k, m])|}{|(W(\omega_k)|} \quad \text{Equation (4)}$$

In the illustrated example of Equations (3) and (4) above, the variable $\phi_{k,m}$ refers to a more precise phase, $\angle(\cdot)$ refers to the argument of a complex number, $|\cdot|$ refers to the magnitude of a complex number, k refers to frequency bin index, m refers to the time window index, X[k,m] refers to the complex STFT of the recorded audio signal, and $W(\omega_{k,m})$ refers to the discrete-time Fourier transform of the windowing function for the STFT of X[k,m] sampled at the precise continuous frequency location $\omega_{k,m}$ of the peak.

The example contour tracer 204 then utilizes the instantaneous peaks to generate contours corresponding to continuous signal data representing a large amplitude signal. To avoid the time and resource intensive process of determining a contour for all instantaneous peaks, the example contour tracer 204 is configured to trace contours only for a specified percentage of the instantaneous peaks. For example, the peak contour tracing process may conclude when 40% of the instantaneous peaks have been used to trace contours. In some examples, any method may be used to determine an appropriate quantity of contours to trace based on the necessary accuracy and processing speed of an implementation. In order to trace contours for the most prominent points first, the example contour tracer 204 traces contours for peaks in descending order of amplitude. For example, the contour tracer 204 begins by tracing the contour of the data point with the largest amplitude. Upon completion of this trace, the example contour tracer 204 identifies the peak with the next largest amplitude, and proceeds with tracing contours until the previously described stopping condition is met. In other examples, any method to identify and trace peaks in any possible order may be utilized.

Once a peak has been selected at which to begin a contour trace, the example contour tracer 204 traces a contour by stepping forward and backwards by individual STFT frames and determining if another large amplitude data point is present within an allowable distance from the previous point. The example contour tracer 204 is configured with various parameters to define the threshold within which a point can be considered a point of comparatively large amplitude (e.g., a peak). For example, the contour tracer 204 may be configured so that any point to be considered a peak must be equal or greater in amplitude than a 0.00001 fraction of the overall maximum spectral amplitude of the audio sample. In addition to this overall amplitude requirement, the example contour tracer 204 is configured with parameters for allowable deviations in phase, frequency and amplitude when stepping forwards and backwards to find additional peaks. For example, in one implementation of the example contour tracer 204, the allowable change in frequency between nearby peaks must be within the window bandwidth specified in the STFT analysis. Additionally, the absolute complex distance between consecutive peaks must be within 1.0 times the amplitude of the previous peak. In other examples, these parameters may be configured to be more or less selective as necessary.

The example contour tracer 204 is additionally configured with a parameter to define the maximum allowable decrease of any peak in a contour with respect to the initial point of comparatively large amplitude at which the contour tracing began. For example, the contour tracer 204 may be configured to only allow peaks which have equal or larger amplitude than 35% below the initial point of comparatively large amplitude to be part of the contour. Additionally, the example contour tracer 204 requires that the contour have a minimum length of 40 milliseconds and a maximum length of 1 second. A contour which does not meet any of these or other requirements set forth by the contour tracer 204 when a contour trace concludes is cleared and the contour tracing process continues by moving on to the next largest amplitude peak in the audio signal. Alternatively, the contour tracing process may continue at any other identified point of comparatively large amplitude. For data points which meet the requirements of the contour tracer 204 to be included in a contour, the signal to noise ratio is additionally calculated. For example, the signal to noise ratio can be calculated by accumulating the squared peak amplitude values and squared complex distance values for all points in a contour. Then, the mean square value for all amplitude values for the contour is divided by the mean square value of all complex distance values over the contour. For example, the mean square value of the amplitude differences may be described in accordance with Equation (5) below:

$$|A_{k,m}e^{i\phi_{k,m}} - A_{s,m-\mu}e^{i(\omega_{s,m-\mu}M+\phi_{s,m-\mu})}| \quad \text{Equation (5)}$$

In the illustrated example of Equation (5) above, the variable k and s refer to the STFT frequency bins from which a precise amplitude, frequency or phase was calculated, the variable m refers to the corresponding time window index, $\mu$ refers to the step in STFT frames when tracking (+ve for forward and −ve for backwards in time), $A_{k,m}$ refers to the precise amplitude calculated for a peak, $\phi_{k,m}$ refers to the precise phase calculated for a peak, $\omega_{s,m}$ refers to the precise frequency calculated for frequency bin s at time window m, and M refers to the increment in samples between STFT windows.

The example contour tracer 204 may additionally have a minimum signal to noise ratio to attempt to eliminate spurious contours from consideration. For example, the contour tracer 204 may require that the signal to noise ratio be at least 1. In other examples, the contour tracer 204 may be configured with any requirements, and any combination or individual implementation of the example requirements disclosed herein may be implemented.

The example contour tracer 204, upon encountering a STFT frame which does not have any signal data points which meet the requirements in a frame to be a part of the contour, proceeds to the next frame, incrementing a counter which monitors how many consecutive frames do not have any data points which meet the requirements. The example contour tracer 204 is configured with a maximum number of skipped STFT frames. For example, the maximum number of skipped STFT frames between peaks may be configured to 10 frames. In this example, when the counter reaches 10, tracing for a specific contour switches to proceed in the opposite direction and begins again from the initial point of large amplitude. When the maximum number of skipped STFT frames is again reached in this opposite direction, tracing for the current contour concludes.

The example contour tracer 204, in addition to tracing contours in an order based upon the data points in the signal with the largest amplitude, performs tracing of harmonically related contours. For example, the contour tracer 204 of the illustrated example of FIG. 2 finds harmonically related contours for those contours which pass all requirements disclosed herein for contours (e.g., the minimum noise ratio requirement, minimum and maximum length requirements, etc.). In some examples, the example contour tracer 204 may begin this process by determining the fundamental frequency for a given contour before determining the harmonic contours. In some examples, the fundamental frequency is determined by dividing a previously traced contour by a set of integers to calculate potential base contours. For example, the previously traced contour may be divided by the integers from one to five. The average amplitude of the STFT is then calculated for each potential base contour across all STFT bins within the contour and at a number of its harmonics. For example, the average amplitude may be calculated at all those harmonics at frequencies less than the Nyquist frequency of the STFT. The potential contour with the highest average amplitude may then be selected as the fundamental frequency contour. The example contour tracer 204 utilizes the base contour (the contour traced from a peak using the techniques disclosed herein) to determine the harmonically related contours. The example contour tracer 204 may be configured to require that the base contour fall within a specific frequency range. For example, the contour tracer 204 may require that the base contour fall within a frequency range of 80 Hz-450 Hz. Alternatively, any requirements may be set to determine whether it is appropriate to proceed with finding and tracing harmonic contours. In some examples, upon the initialization of a harmonic trace, the contour tracer 204 utilizes an additional counter to track the number of harmonic frequencies at which contours are traced by the contour tracer 204. The example contour tracer 204 can be configured to stop tracing harmonically related contours after a given number of contours at harmonic frequencies have been traced. The example contour tracer 204 finds the point with the maximum amplitude at a given harmonic multiplier to begin tracing a new contour. The example contour tracer 204 may be configured with a frequency range threshold within which all peaks of the contour must fall. For example, the contour tracer 204 may be configured to require that all peaks of the harmonic contour be within 100 Hz of the integer harmonic multiple of the base contour frequency. When the point with the largest amplitude at a given harmonic multiplier is determined, and the point falls within the frequency range threshold and any other requirements, a contour is traced using the methods disclosed herein. Upon the completion of the contour tracing, the example contour tracer 204 checks additional conditions, such as whether the harmonic contour falls within a length requirement set in the example contour tracer 204. For example, the harmonic contours may be required to extend no longer than 200 milliseconds in time before or after the base contour. In other examples, any requirements may be implemented to ensure that the harmonic contours are representative of harmonics of the base contour.

Figure 8:
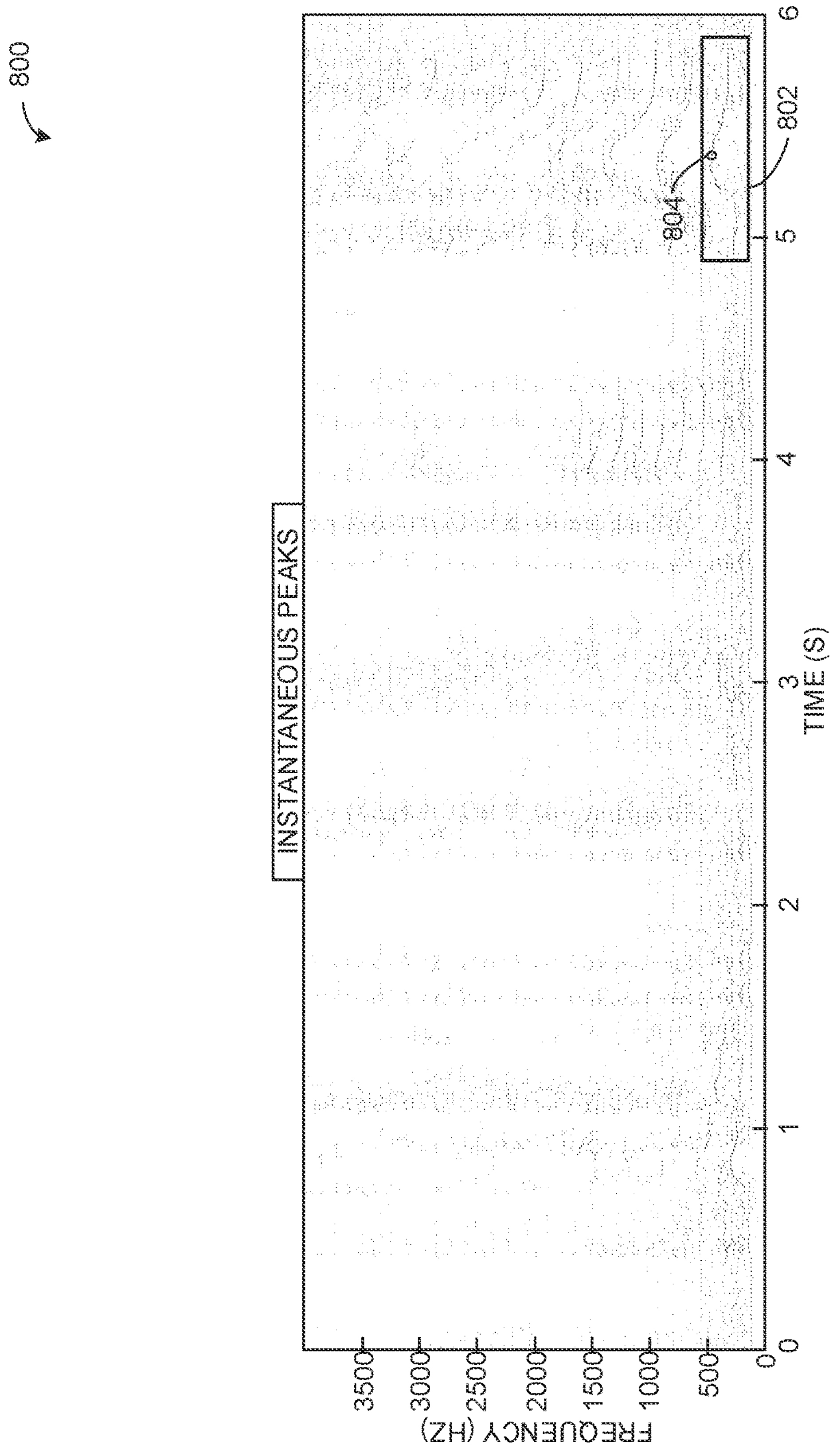
FIG. 8 is an example plot of instantaneous amplitude peaks as generated by the contour tracer of FIG. 2.
Figure 9:
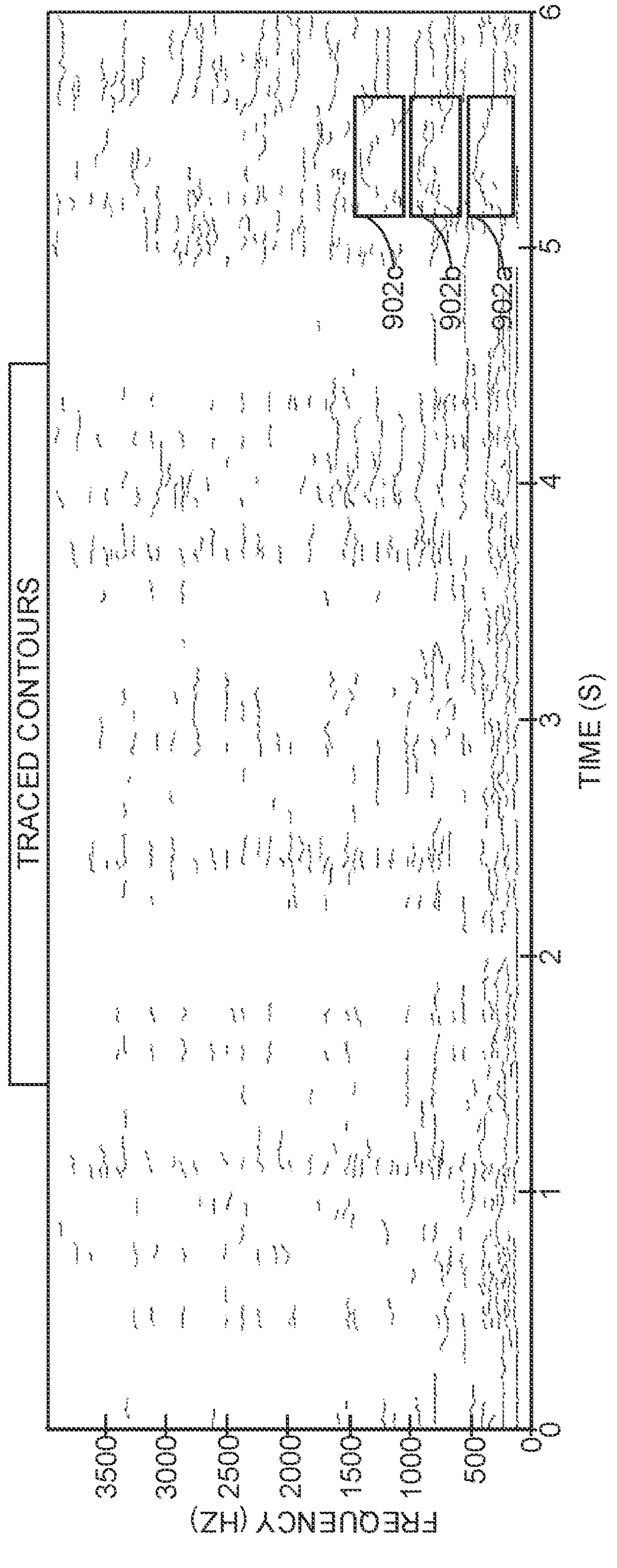
FIG. 9 is an example plot of traced contours as generated by the contour tracer of FIG. 2.

The example contour tracer 204 of the illustrated example of FIG. 2, upon reaching the configured stopping condition (e.g., tracing 40% of the instantaneous peaks for contours, and all allowable harmonics thereof) stores the set of contours to the database 214. In some examples, the example contour tracer 204 stores the contours individually to the database 214 as they are generated and determined to pass all requirements imposed by the contour tracer 204. An illustrated example of a complete set of traced contours for the same audio signal of the spectrograph of FIG. 7 and the instantaneous peaks plot of FIG. 8 is provided in FIG. 9. The example contour 902*a* is an example base contour traced using the methods and techniques disclosed herein. The example contours 902*b* and 902*c* are harmonic contours traced by the example contour tracer 204 using the harmonically related contour tracing process disclosed herein. The traced contours of FIG. 9 are additionally represented in a distribution plot in FIG. 10, which shows the contours plotted by the mean frequency of the contour and the maximum amplitude for a given contour. The example contour set used in these figures represent contour traces initiated from 40% of the instantaneous peaks of FIG. 8.

The example parameter calculator 206 of the illustrated example of FIG. 2 calculates parameters for the contours generated by the contour tracer 204. The parameter calculator 206 determines parameters for contours to assist in the determination of outlier contours which may pertain to noise in the audio signal. For example, the parameter calculator 206 may determine the mean and standard deviation of amplitude values for all contours. Additionally or alternatively, the parameter calculator 206 may determine the median and the median absolute deviation of amplitude values for all contours. The example parameter calculator 206 may determine such contour amplitude statistics based on all peaks belonging to contours or all peaks with the exception of a percentage of the largest maximum amplitude contours and the smallest maximum amplitude contours. For example, the largest 5% of contours by amplitude and the smallest 5% of contours by amplitude may be excluded when calculating the mean contour amplitude. In some examples, the maximum peak amplitude for every given contour can be used to calculate the average amplitude of the contours. Additionally or alternatively, other parameters such as the phase coherence, percent of pitch movement, or any other parameters may be calculated by the parameter calculator 206. The example parameter calculator 206 may, in some examples, be combined with the classifier 208 or with any other component of the harmonic noise reducer 106.

The example classifier 208 of the illustrated example of FIG. 2 determines that contours are outliers based upon the contour parameters calculated by the parameter calculator 206. The classifier 208, for example, can be configured to determine the contours which represent outliers on the basis of a parameter being a statistical distance (e.g., a number of standard deviations) away from the mean. For example, the classifier 208 may determine that a contour which is more than 5 standard deviations from the mean is an outlier. In other examples, this amount of acceptable variance may be adjusted based upon various considerations, such as the quality and characteristics of the input audio (e.g., the amount of interference from noise, the type of noise, etc.), the amount of noise reduction required for a signature generation or other application, or any other consideration. In some examples, a deep neural network or a support vector machine may be used to determine if a contour represents an outlier. Additionally or alternatively, other parameters may be used by the classifier 208 to determine outlier contours. For example, in the illustrated example of FIG. 2, the classifier 208 additionally checks a condition that contours have a signal to noise ratio greater than 40 to be considered an outlier.

Figure 11:
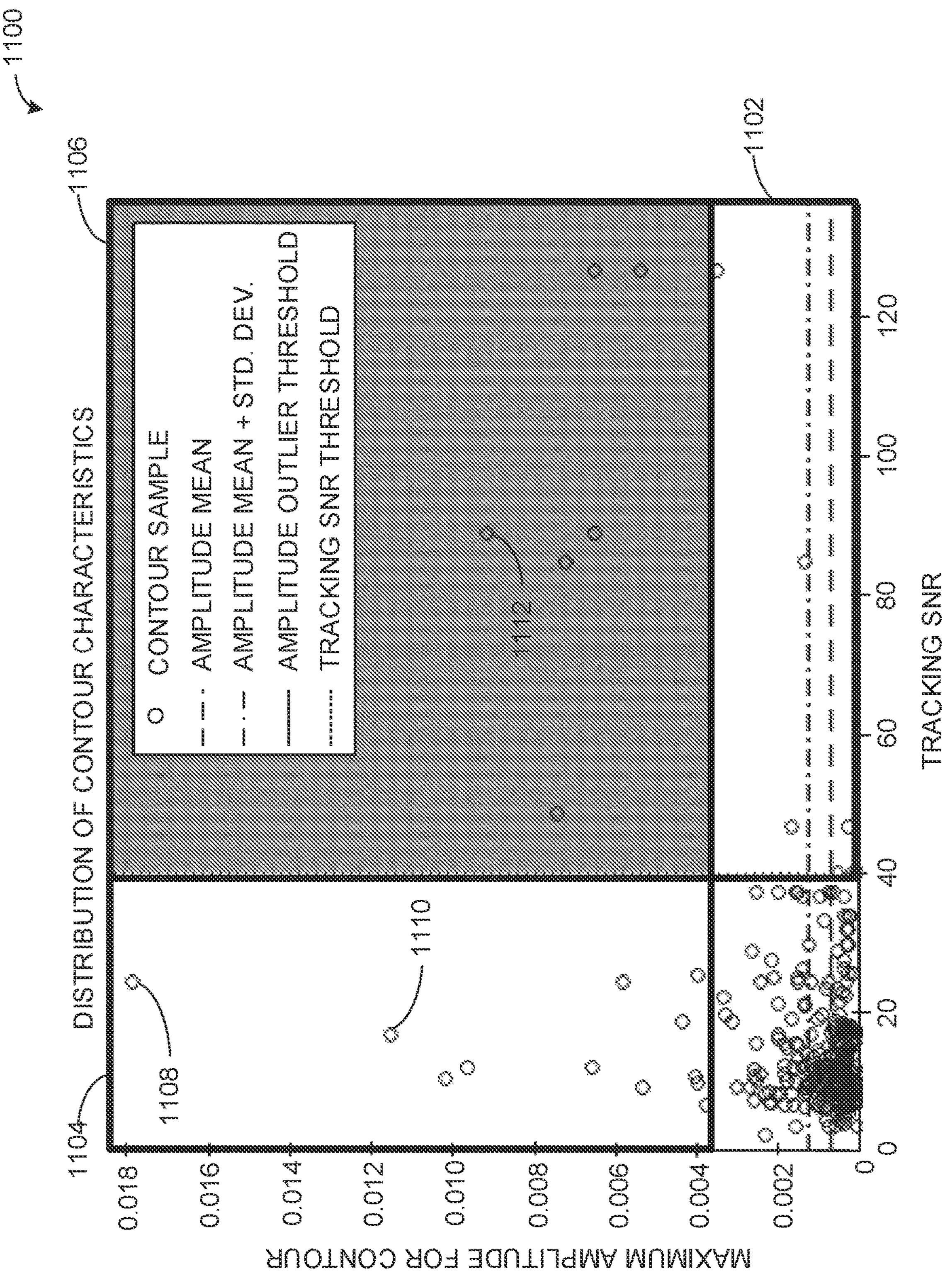
FIG. 11 is an example distribution of contour characteristics with outlier thresholds as generated by the classifier of FIG. 2.
Figure 12:
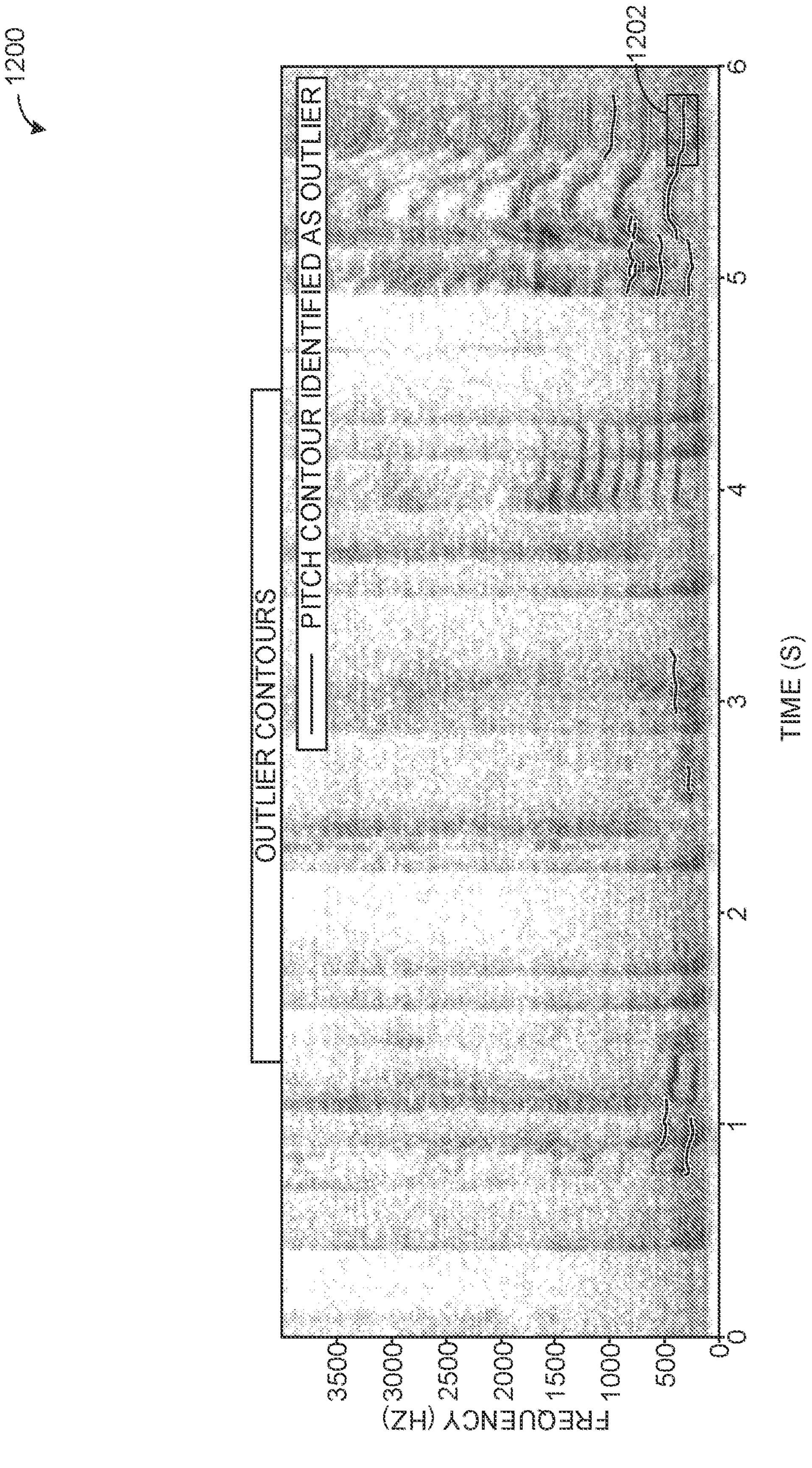
FIG. 12 is an example outlier contour plot showing outlier contours against the original spectrogram, as generated by the classifier of FIG. 2.
Figure 13:
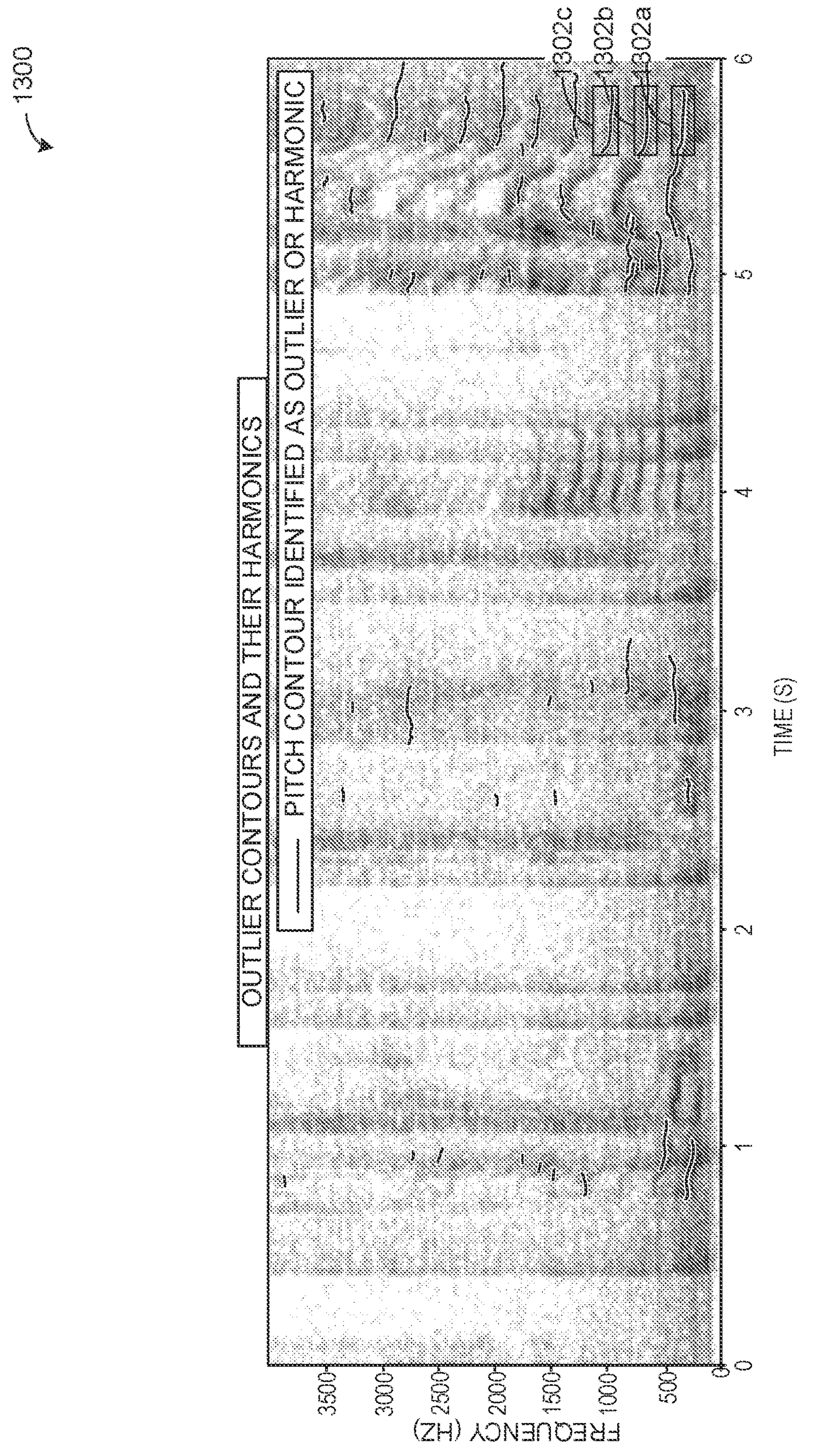
FIG. 13 is an example outlier contour plot including harmonics of the identified outliers, as generated by the classifier of FIG. 2.

The example audio signal from FIGS. 7-10 is analyzed by the classifier 208 with a threshold of a minimum signal to noise ratio (SNR) of 40 and a maximum amplitude deviation of 5.2 standard deviations. The contours are plotted along with the SNR and amplitude standard deviation cutoffs in FIG. 11. The example region 1102 includes several contours with very large signal to noise ratios, but amplitudes below the threshold in the example (e.g., the mean plus 5.2 standard deviations). Hence, contours in region 1102 are determined not to be outliers. In the example region 1104, there are numerous contours with amplitude that exceeds the maximum allowable amplitude for a contour in this example (e.g., the mean plus 5.2 standard deviations). However, the signal to noise ratio of these contours is relatively low, and hence they are not determined to be outliers nor targeted for subtraction from the audio signal. The example region 1106, however, includes contours which are both above the signal to noise ratio threshold and the maximum amplitude threshold. In this example, these points are determined by the classifier 208 to be outliers, and subsequently removed from the audio signal. The identified outlier contours from FIG. 11 are further illustrated by the traced contours of FIG. 12. For example, section 1202 includes a section of a contour that has been identified as an outlier. In the spectrogram with overlaid outlier contour identifiers of FIG. 12, there are a several outlier contours, all in relatively low frequency bands. The example classifier 208 further identifies the harmonic contours corresponding to outlier contours to be outliers as well, as illustrated in FIG. 13. In this example spectrogram with overlaid outlier contour identifiers, the base outlier contour 1302*a*, as previously identified in section 1202 of FIG. 12, is identified as an outlier, along with harmonics 1302*b* and 1302*c* of the base outlier contour 1302*a*. Additional harmonics are shown in the larger frequency bands as well and are identified as outliers and flagged by the example classifier 208 for subsequent removal from the audio signal.

Figure 14:
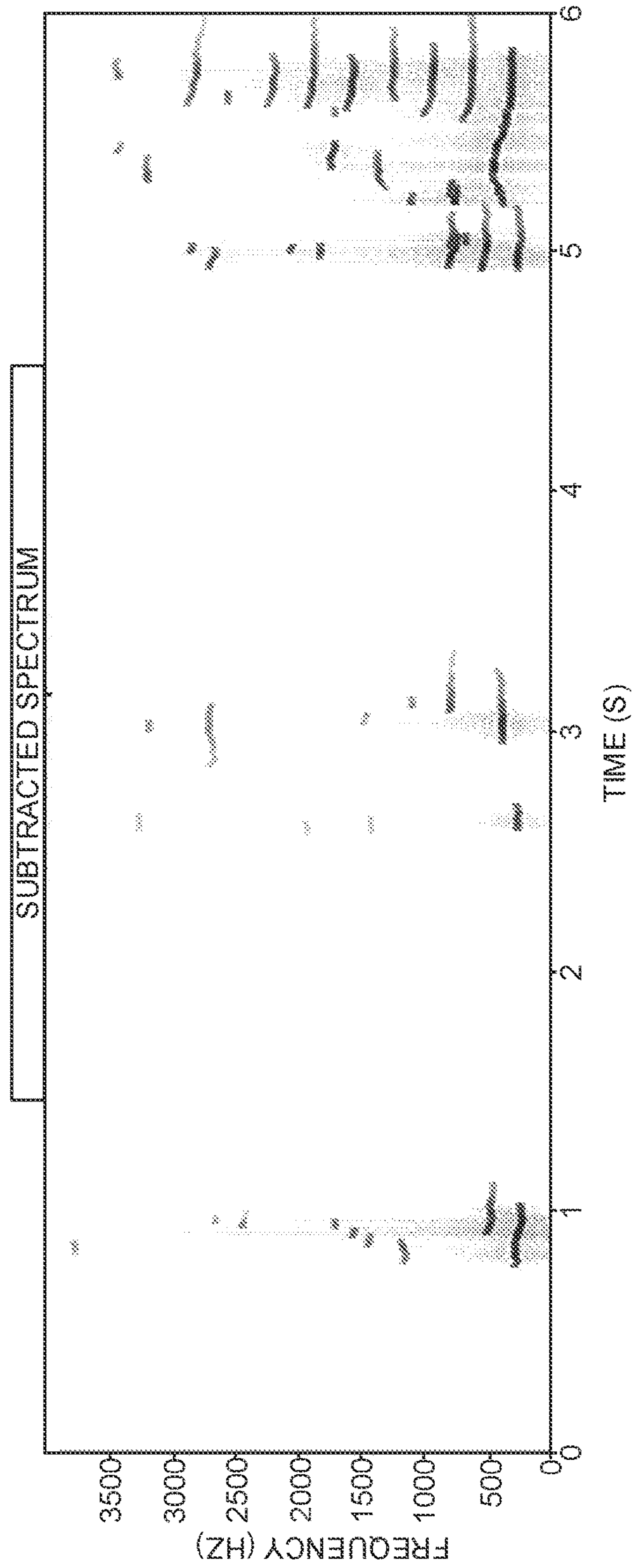
FIG. 14 is an example subtracted spectrum of the outlier contours to be subtracted from the overall audio sample, as generated by the subtractor of FIG. 2.
Figure 15:
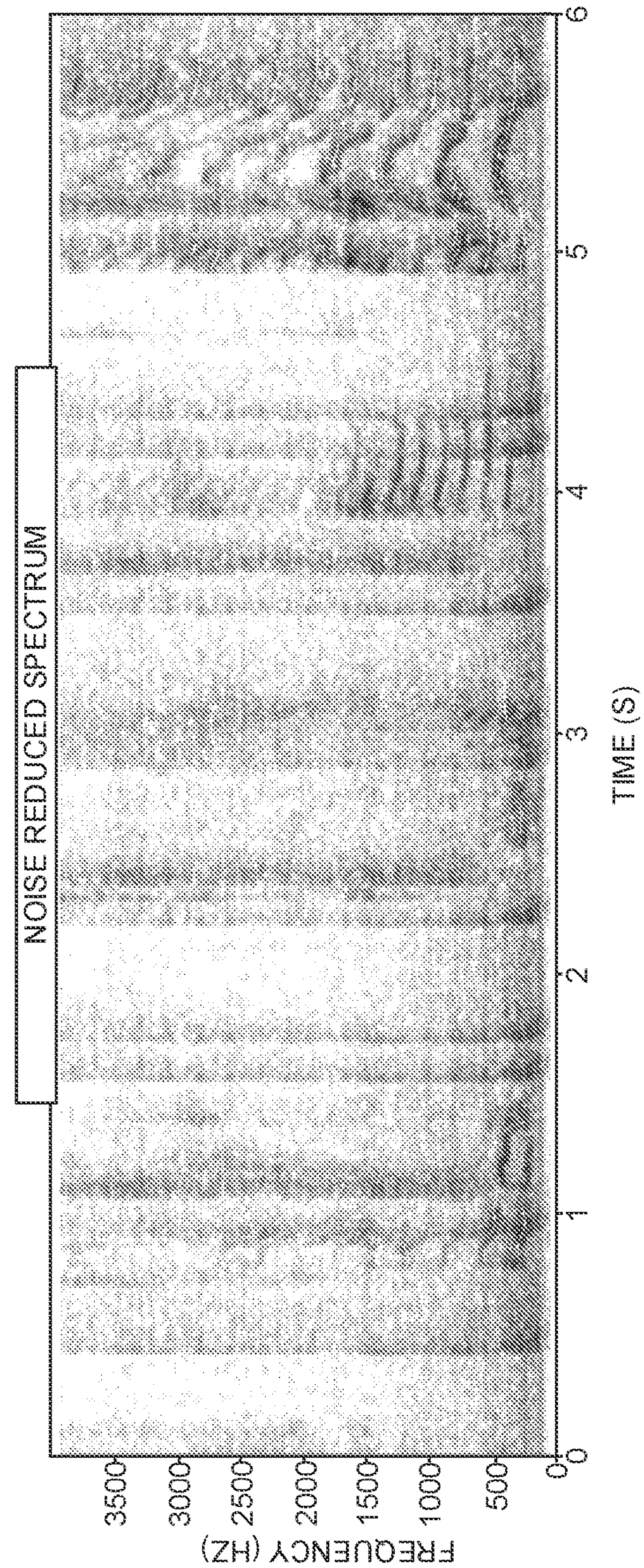
FIG. 15 is an example noise-reduced spectrum as generated by the synthesizer of FIG. 2.

The example subtractor 210 of the illustrated example of FIG. 2 subtracts the identified outliers from the original audio signal to reduce the noise in the audio signal. In order to remove the outlier contours, the example subtractor 210 creates and subtracts complex short-time spectra of contours from the overall audio sample. Prior to performing the subtraction, the subtractor 210 must synthesize a full noise spectrum with amplitude, frequency and phase values for all determined noise contours and an empty spectrum for the remaining signal. The noise spectrum can then be subtracted from the STFT representation of the audio signal to remove the noise contours. An example of the aspects that are deleted from the audio signal analyzed in FIGS. 7-13 is shown in the illustrated example of FIG. 14. In this example spectrogram, the outlier contours identified in FIG. 13 are shown. The example subtractor 210 then subtracts these identified outlier contours from the overall audio sample spectrogram. An example result of the subtraction performed by the subtractor 210 on the dataset analyzed in FIGS. 7-14 is shown in FIG. 15. As shown, the areas previously including dark (e.g., large amplitude) contours now appear white (e.g., no amplitude). The example subtractor 210 of the illustrated example may subtract the outlier signals by any method which effectively eliminates or mitigates the amplitude of the contours which are determined to be outliers.

The example synthesizer 212 of the illustrated example of FIG. 2 completes the noise reduction process by synthesizing the noise-reduced audio signal. The example synthesizer 212 performs an inverse fast Fourier transform to transform the signal from the frequency domain to the time domain. The resulting signal is a noise-reduced signal with an enhanced likelihood that the sample can be utilized to generate accurate audio signature(s) for the media represented by the audio sample. In some examples, the synthesizer 212 transmits the noise-reduced audio output signal to the network 108. Additionally or alternatively, the synthesizer 212 may save the noise-reduced audio output signal to the database 214.

The example database 214 of the illustrated example of FIG. 2 is used for storage of the initial audio samples, as well as the noise-reduced audio samples, and data utilized in intermediary processes to transform the initial audio samples to the noise-reduced audio samples. Additionally or alternatively, the example database 214 may be used to store models, parameters, functions, scripts or any other data necessary to perform the processing of the harmonic noise reducer 106. The example database 214 is an implementation for storing data such as, for example, a physical device (e.g., flash memory, magnetic media, optical media, etc.), a firmware or a software implementation (e.g., an organized system of data storage) or any combination of these forms. The data stored in the example database 214 may be in any data format such as, for example, binary data, comma delimited data, tab delimited data, structured query language (SQL) structures, audio files (e.g., mp3, way, etc.), MATLAB® data, or any other data type. In some examples, the original audio sample data may be overwritten or deleted upon the creation of the noise-reduced audio sample. In some examples, the database 214 may store and organize numerous audio samples belonging to the same audio recording (e.g., samples pertaining to the same media for which an audio signature is to be generated). While, in the illustrated example, the database 214 is illustrated as a single database, the database 214 may be implemented by any number and/or type(s) of databases.

While an example manner of implementing the harmonic noise reducer 106 of FIG. 1 is illustrated in FIG. 2, one or more of the elements, processes and/or devices illustrated in FIG. 2 may be combined, divided, re-arranged, omitted, eliminated and/or implemented in any other way. Further, the example domain converter 202, the example contour tracer 204, the example parameter calculator 206, the example classifier 208, the example subtractor 210, the example synthesizer 212, the example database 214 and/or, more generally, the example harmonic noise reducer 106 of FIG. 1 may be implemented by hardware, software, firmware and/or any combination of hardware, software and/or firmware. Thus, for example, any of the example y, the example Z and/or, more generally, the example harmonic noise reducer 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example domain converter 202, the example contour tracer 204, the example parameter calculator 206, the example classifier 208, the example subtractor 210, the example synthesizer 212, the example database 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example harmonic noise reducer 106 of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing the harmonic noise reducer 106 of FIGS. 1 and 2 are shown in FIGS. 3-6. In this example, the machine readable instructions comprise a program for execution by a processor such as a processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 3-6, many other methods of implementing the example harmonic noise reducer 106may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-6 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 3:
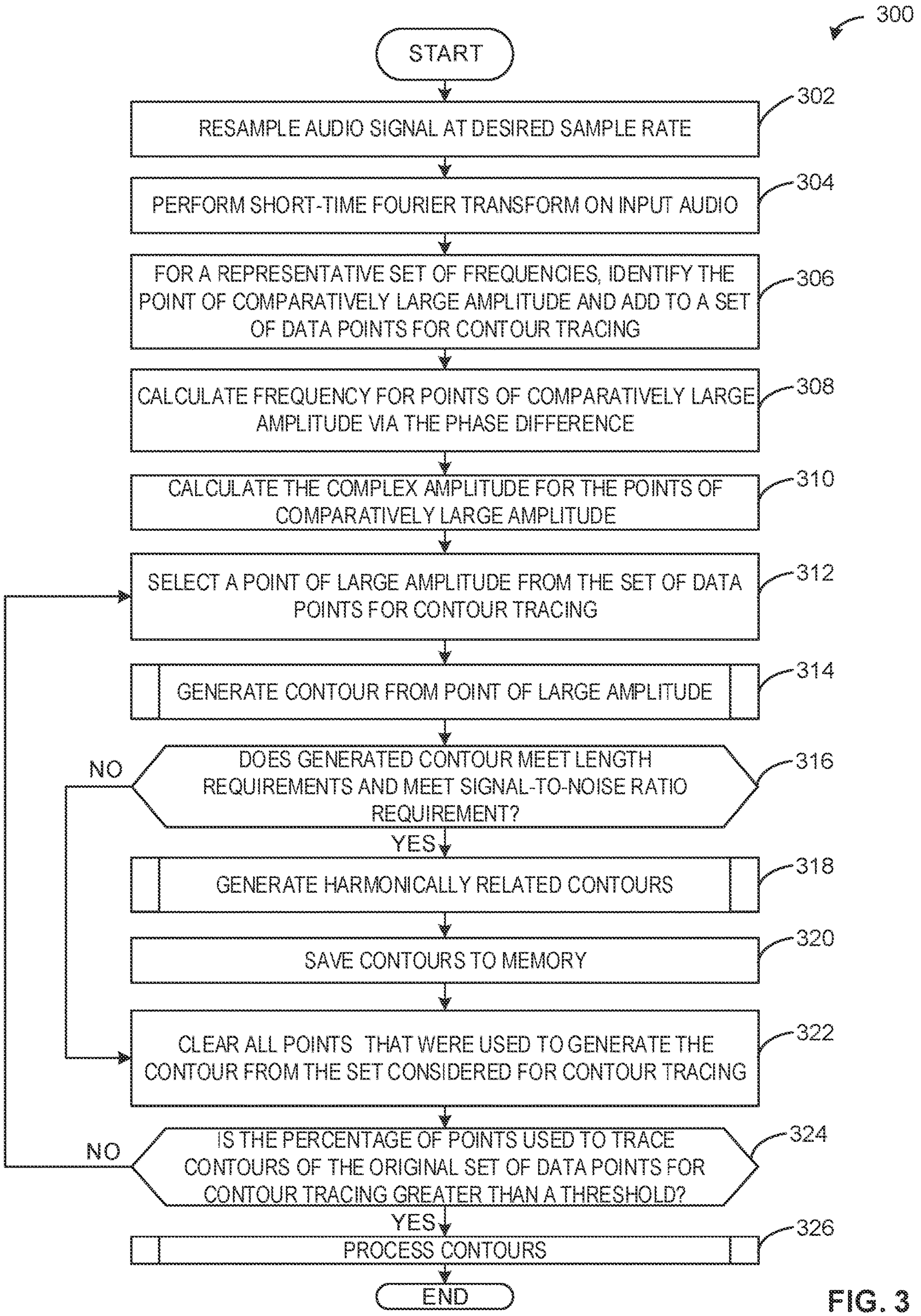
FIGS. 3-6 are flowcharts representative of example machine readable instructions that may be used to implement the harmonic noise reducer of FIG. 2 to reduce the harmonic noise present in an audio sample.

Example machine readable instructions for implementing the harmonic noise reducer 106 of FIG. 2 and that may be executed perform domain conversion and contour tracing of an audio signal are illustrated in FIG. 3. With reference to the preceding figures and associated descriptions, the example machine readable instructions 300 of FIG. 3 begin with the example harmonic noise reducer 106 resampling the audio signal at the desired sample rate (block 302). For example, the example domain converter 202 may resample the audio signal received by the harmonic noise reducer 106 to prepare the audio signal for further processing. For example, the desired sample rate may be selected based on an optimal sample rate for the short-time Fourier transform parameters that are specified by the example domain converter 202.

At block 304, the example harmonic noise reducer 106 performs a short-time Fourier transform (STFT) on the input audio. For example, the domain converter 202 may perform the STFT on the input audio signal to discretize the signal and provide a representation of the audio signal in the frequency domain, as illustrated in the spectrogram of FIG. 7. In some examples, the domain converter 202 may use any other transform to generate a frequency-domain representation of the audio signal for further analysis.

At block 306, the example harmonic noise reducer 106 identifies the point of comparatively large amplitude (e.g., peaks) at each frequency for a representative set of frequencies and adds the points to a set of data points for contour tracing. For example, the contour tracer 204 may identify the points of greatest amplitude as a first step in determining appropriate points at which to begin contour tracing, as illustrated by the plot of instantaneous peaks shown in FIG. 8. The size and relative resolution of this set of points as a representation of the large-amplitude sections of the signal is dependent on, among other things, the parameters (e.g., window size, sampling rate, etc.) applied during the steps executed by the domain converter 202. In other examples, a set of points of greatest amplitude may be generated to serve as a seed set for contour tracing by any other method (e.g., identifying a percentage of the largest amplitude data points in the audio signal, identifying a set of points with amplitude in excess of a specified deviation amount from a mean, etc.).

At block 308, the example harmonic noise reducer 106 calculates the frequency for points of comparatively large amplitude via a phase difference. For example, the example contour tracer 204, in the process of initializing contour traces, may calculate the precise frequency at every point. While the identification of the point of large amplitude at a representative set of frequencies determines approximate peaks to use in contour tracing (due to the discretized nature of the data), the example contour tracer 204 refines the frequency and provides additional accuracy by calculating the phase difference for every peak. Additionally or alternatively, any other method of providing a more precise frequency value for a given peak may be utilized.

At block 310, the example harmonic noise reducer 106 calculates the complex amplitude for the points of comparatively large amplitude. For example, the example contour tracer 204, in the process of initializing contour traces, may calculate the complex amplitude for every point of greatest amplitude. As in the calculation of the frequency, the calculation of the complex amplitude at the peaks provides a more accurate amplitude and phase that may be effectively located at a continuous range of frequency values. Additionally or alternatively, any other method of providing a more precise complex amplitude for a given peak may be utilized.

At block 312, the example harmonic noise reducer 106 selects a point of large amplitude from the set of data points for contour tracing. For example, the harmonic noise reducer 106 may select the point with the largest overall amplitude from the set of data points for contour tracing. The contour tracer 204 may find the point of comparatively large amplitude, such as the example largest amplitude point 804 of the instantaneous peaks plot illustrated in FIG. 8. The example contour tracer 204 initiates tracing all contours (with the exception of harmonic contours, which are initialized as described in FIG. 5) by finding a peak in the dataset with a comparatively large overall amplitude, or, in some examples, by finding the peak with the largest overall amplitude of the set.

At block 314, the example harmonic noise reducer 106 generates a contour from the point of large amplitude selected at block 312. For example, the contour tracer 204 may generate the contour from the point of large amplitude selected, as shown by the region 802 in the illustrated example of FIG. 8. Detailed instructions to generate the contour from the point of large amplitude are provided in FIG. 4.

At block 316, the example harmonic noise reducer 106 determines if the generated contour meets the length and signal to noise ratio requirements. For example, the contour tracer 204 may determine if the generated contour meets the length and signal to noise ratio requirements to determine if the contour should be stored and/or used to find harmonically related contours. In some examples, the length of the contour must be above a minimum length (to avoid the resource-intensive, low-reward process of processing numerous miniscule contours), and below a maximum length. Additionally, in some examples, the signal to noise ratio must be above a specified minimum to indicate that true interference, as would affect the potential precision of a generated audio signature, could potentially be present in the contour. Because audio signatures are often robust to typical low-amplitude noise and low SNR values may indicate a spurious contour, contours with low SNR values are generally not useful to remove in the example application of generating audio signatures. In other examples, the example contour tracer 204 may check any additional or alternative conditions for a generated contour to be further processed. In response to the generated contour meeting the length requirements and SNR ratio requirement, processing transfers to block 318. Conversely, if the generated contour does not meet the length requirements and/or the SNR ratio requirements, processing transfers to block 322.

At block 318, the example harmonic noise reducer 106 generates harmonically related contours. For example, the contour tracer 204 may generate harmonically related contours such as the contours 802*b* and 802*c* shown in the illustrated example of FIG. 8. Example instructions to generate harmonically related contours are provided in FIG. 5.

At block 320, the example harmonic noise reducer 106 saves the contours to memory in the database 214. For example, the contour tracer 204 may store the generated contours to memory in the database 214 after the tracing process for a contour or set of contours has concluded. The example contour tracer 204 stores not only the contour generated from the point of large amplitude (block 314), but also any generated harmonically related contours (block 318). Alternatively, the example contour tracer 204 may store the generated contours in any location accessible to the harmonic noise reducer 106.

At block 322, the example harmonic noise reducer 106 clears all points that were used to generate the contour from the set considered for contour tracing. For example, the contour tracer 204 may clear the point of large amplitude that started the contour, and all points consumed in generating that contour, in order to enable the discovery of the next largest amplitude peak for a new contour to be traced. As a result, the number of remaining points from which to begin a new contour is reduced, and a new largest amplitude peak exists in the set.

At block 324, the example harmonic noise reducer 106 determines if the percentage of points used to trace contours from the original set of data points for contour tracing is greater than a threshold. For example, the contour tracer 204 may determine if the percentage of points used to trace contours from the original set of data points for contour tracing is greater than a threshold in order to check the tracing stopping condition. For example, the contour tracer 204 may be configured to terminate contour tracing once 40% of the largest amplitude peaks have been utilized to draw contours. When the threshold for the percentage of contours has been reached, the tracing of contours is complete, as shown in the illustrated example of FIG. 9. In response to the percentage of points used to trace contours from the original set being greater than a threshold, processing transfers to block 326. Conversely, if the percentage of points used to trace contours from the original set of data points is not greater than the threshold, processing transfers to block 312.

At block 326, the example harmonic noise reducer 106 processes contours. For example, the parameter calculator 206, classifier 208 and subtractor 210 may generate contour parameters, determine contours to be outliers, and remove outliers from the audio sample. The contour processing of block 326 is described in the flowchart illustrated in FIG. 6.

Figure 4:
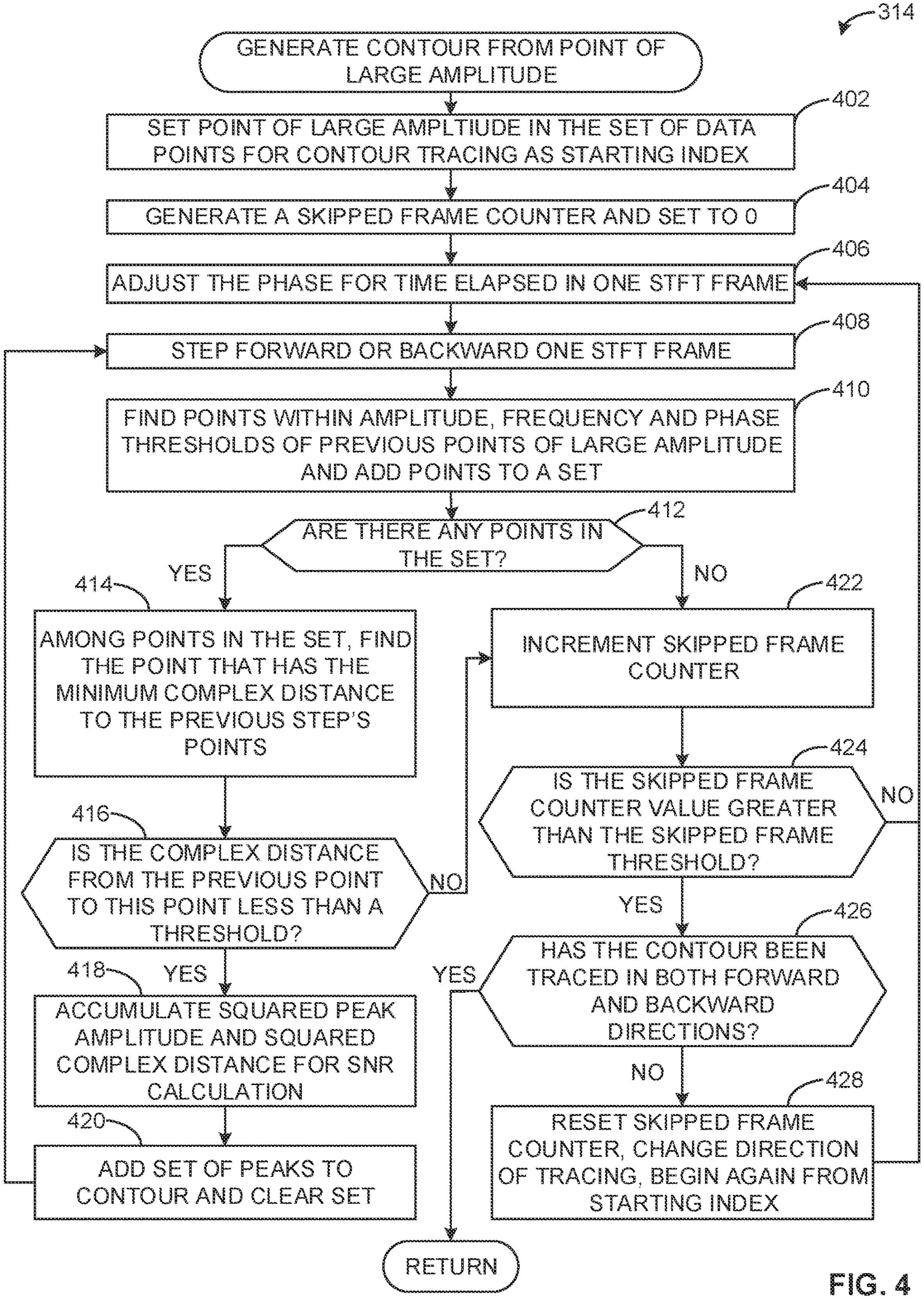

Example machine readable instructions 314 for implementing the harmonic noise reducer 106 of FIG. 2 and that may be executed to perform the generation of contours based on data points of comparatively large amplitude from the audio sample are illustrated in FIG. 4. With reference to the preceding figures and associated descriptions, the example machine readable instructions 314 of FIG. 4 begin with the example harmonic noise reducer 106 setting the point of large amplitude in the set of data points for contour tracing as the starting index (block 402). For example, the contour tracer 204 may set the point of largest amplitude in the set of data points as the starting index to initialize a contour trace. The contour tracer 204 begins a new trace, with the peak having the greatest amplitude in the set of data points for contour tracing (e.g., as determined in FIG. 3, block 306) as the starting point for the new contour trace. In other examples, a different method of selecting a starting peak for contour tracing may be utilized (e.g., selecting peaks which meet threshold amplitude, frequency, or phase thresholds, selecting peaks which are in a specific sample region of interest, etc.).

At block 404, the example harmonic noise reducer 106 generates a skipped frame counter and sets its value to 0. For example, the contour tracer 204 may generate the skipped frame counter and set its value to 0. The skipped frame counter enables the example contour tracer 204 to ensure that any new peaks that are found during contour tracing are within a reasonable distance from the prior peak in the contour, as defined by a number of allowable skipped STFT frames during contour tracing.

At block 406, the example harmonic noise reducer 106 adjusts the phase for the time elapsed in one STFT frame. For example, the contour tracer 204 may adjust the phase for the time elapsed in one STFT frame to enable comparison of the previous frame to the current frame in the frequency domain.

At block 408, the example harmonic noise reducer 106 steps forward or backward one STFT frame. For example, the contour tracer 204 may be configured to first step forward and proceed with contour tracing until a stopping condition is reached (e.g., block 424). The example contour tracer 204 steps by individual STFT frames to find points in succession within a specified number of frames from the contour, as tracked by the skipped frame counter. Then, the example contour tracer 204 returns to the starting index and proceeds in the backward direction to trace the remaining peaks that meet the requirements to be part of the contour. In other examples, the example contour tracer 204 may proceed backwards first and forwards after the stopping condition has been reached in the backwards direction. In other examples, any other step size may be utilized.

At block 410, the example harmonic noise reducer 106 finds the points within the preconfigured amplitude, frequency and phase threshold ranges of the previous point of large amplitude, and adds these points to a set. For example, the example contour tracer 204 may be configured to check conditions pertaining to the amplitude, frequency, complex distance, and any other parameters to determine whether points should be added to the set of points belonging to the contour.

At block 412, the example harmonic noise reducer 106 determines if there are any points in the set. For example, the contour tracer 204 may be configured to determine if there are any points in the set. If a point meeting the requirement thresholds of the example contour tracer 204 has been found in the current step, the set will contain at least this point, along with any others meeting the requirements. If no points are found in the set, then no data meeting the requirements to be a part of the contour has been found in this STFT step. In response to the harmonic noise reducer 106 determining that there is a peak in the set, processing transfers to block 414. Conversely, in response to the harmonic noise reducer 106 determining there are no peaks in the set, processing transfers to block 422.

At block 414, the example harmonic noise reducer 106 finds the point with the minimum complex distance to the previous step's point (e.g., from the previous time step). For example, the contour tracer 204 may find the point with the minimum complex distance to the previous point. In some examples, this point then serves as the peak representation for the STFT step. In other examples, an average or other manipulation may be performed on the points in the set to determine an adequate representative point for the STFT step instead of utilizing the point with the minimum complex distance.

At block 416, the example harmonic noise reducer 106 determines if the complex distance from the phase adjusted previous point to the current point is less than a threshold. For example, the contour tracer 204 may determine if the complex distance from the previous points (e.g., of the previous STFT step) to the current point is less than the threshold. To ensure a point that is added to the contour belongs to the same signal which may potentially represent noise, the example contour tracer 204 is configured with a threshold for a maximum complex distance that a peak may be from the peak of a previous frame to still be considered part of the contour being traced.

At block 418, the example harmonic noise reducer 106 accumulates the squared peak amplitude and squared complex distance (e.g., between phase adjusted consecutive points in the set) to be later used by the contour tracer 204 for determining the signal to noise ratio for the contour, using, for example, the process described herein including equation 5. For example, the contour tracer 204 may accumulate the squared peak amplitude and squared complex distance values. The squared peak amplitude and squared complex distance values may be stored to any location accessible by the parameter calculator 206, and may be stored in any format (e.g., matrix representation, delineated data, etc.).

At block 420, the example harmonic noise reducer 106 adds the set of points to the contour and clears the set so that it no longer contains any data. For example, the example contour tracer 204 may clear the set of points in order to initialize a new step, at which a new set of points must be found. In some examples, the example contour tracer 204 may only add the maximum amplitude point, or selectively add points to the counters based on additional parameters.

At block 422, the example harmonic noise reducer 106 increments the skipped frame counter. For example, the skipped frame counter may be implemented by the contour tracer 204, and increment for every STFT frame in which an eligible point to be added to the set cannot be found. In this example situation (at block 422), the contour tracer 204 was unable to find any points within the amplitude, frequency and phase thresholds of the previous points of large amplitude. Hence, the set of points to be added to the contour is empty, and the frame is considered "skipped." In some examples, a more stringent requirement of terminating the contour when a single skipped frame is encountered may be implemented, eliminating the need for a skipped frame counter and instead implementing a new stopping condition.

At block 424, the example harmonic noise reducer 106 determines if the skipped frame counter value is greater than the skipped frame threshold. For example, the contour tracer 204 may determine if the skipped frame counter value is greater than the skipped frame threshold. The example contour tracer 204 is configured with a threshold for the maximum number of allowable successive frames in which no peak may be found before contour tracing in a direction is terminated. In response to the skipped frame counter being greater than the skipped frame threshold, processing transfers to block 426. Conversely, in response to the skipped frame counter not being greater than the skipped frame threshold, processing transfers to block 406.

At block 426, the example harmonic noise reducer 106 determines if the contour has been traced in both forward and backward directions. For example, the example contour tracer 204 may determine if the contour tracing has been executed in both forward and backward directions. The example contour tracer 204 must reach stopping conditions in both forward and backward directions with respect to tracing the contour from the initial starting point prior to terminating the contour trace. In response to the contour having been traced in both forward and backward directions, processing returns to the instructions of FIG. 3 and transfers to block 316. Conversely, in response to the contour tracing not having been executed in both the forward and backward directions, processing transfers to block 428.

At block 428, the example harmonic noise reducer 106 resets the skipped frame counter, changes the direction of tracing and begins the tracing process again from the starting index. For example, the example contour tracer 204 may reset the frame counter, change the direction of tracing and begin the tracing process again form the starting index to continue tracing the contour in the second direction.

Figure 5:
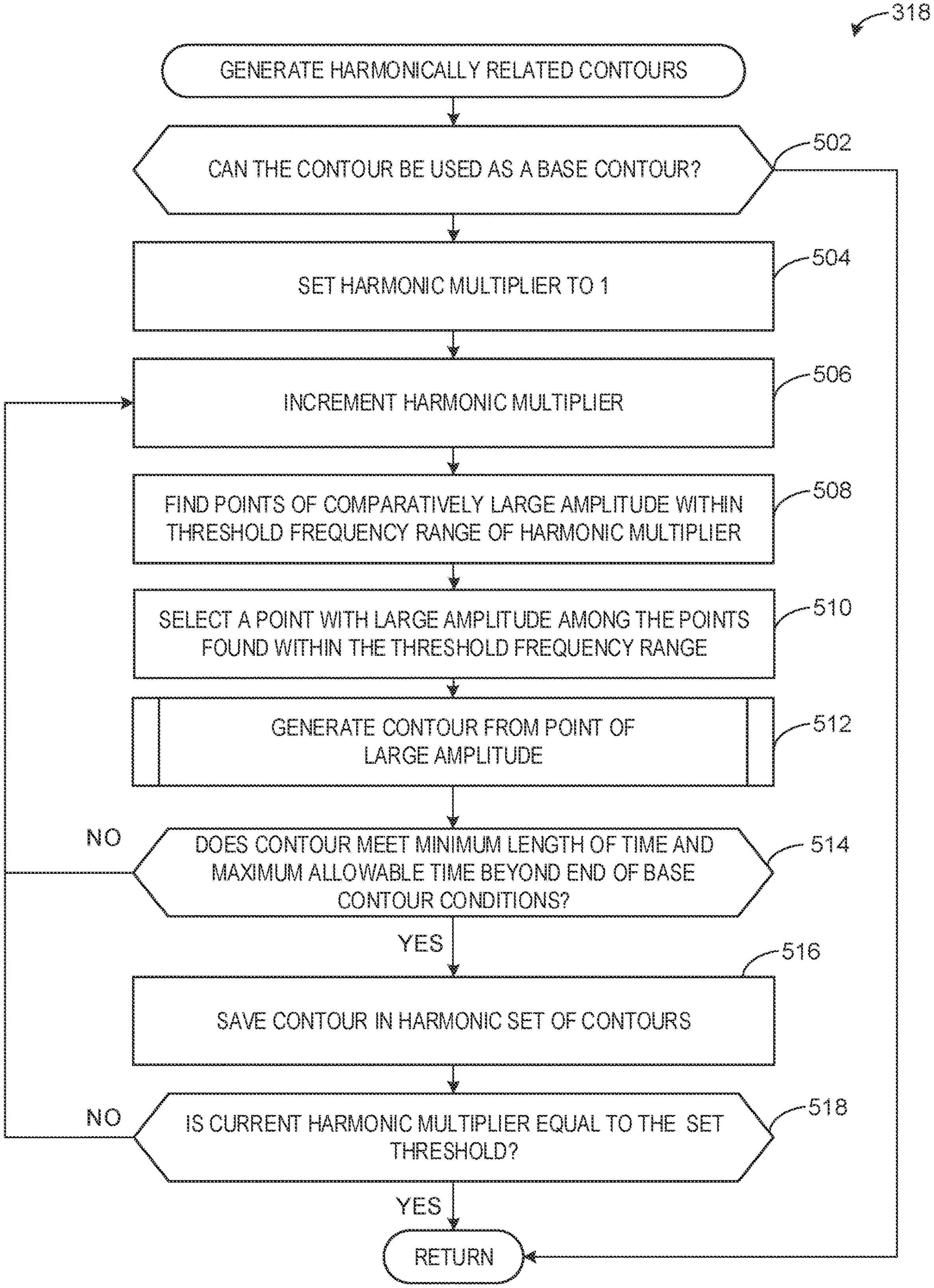

Example machine readable instructions 318 for implementing the harmonic noise reducer 106 of FIG. 2 and that may be executed to perform the generation of harmonically related contours based on a base contour are illustrated in FIG. 5. With reference to the preceding figures and associated descriptions, the example machine readable instructions 318 of FIG. 5 begin with the example harmonic noise reducer 106 determining if the contour generated from the point of large amplitude may be used as a base contour (block 502). For example, the example contour tracer 204 may determine if the contour generated from the point of large amplitude may be used as a base contour. In some examples, the example contour tracer 204 may check that the contour generated from the point of large amplitude falls within a certain frequency range, indicating it may be acceptable for use as a base contour to determine harmonic contours. Additionally or alternatively, the example contour tracer 204 may calculate the base contour by dividing a previously traced contour by a set of integers to calculate potential base contours. For example, the previously traced contour may be divided by the integers from one to five. The average amplitude of the STFT is then calculated for each potential base contour across all STFT bins within the contour and at a number of its harmonics. For example, the average amplitude may be calculated at all those harmonics at frequencies less than the Nyquist frequency of the STFT. The potential contour with the highest average amplitude may then be selected as the fundamental frequency contour. In response to the example harmonic noise reducer 106 determining that the contour can be used as a base contour, processing transfers to block 504. Conversely, if the contour cannot be used as a base contour, processing returns to the instructions of FIG. 3 and transfers to block 320.

At block 504, the example harmonic noise reducer 106 sets the harmonic multiplier to 1. For example, the contour tracer 204 may set the harmonic multiplier to 1. The harmonic multiplier is initialized at a value of 1, representing the base contour, and incremented to determine harmonically related contours.

At block 506, the example harmonic noise reducer 106 increments the harmonic multiplier. For example, the contour tracer 204 may increment the harmonic multiplier in order to begin tracing harmonically related contours.

At block 508, the example harmonic noise reducer 106 finds the points of comparatively large amplitude within the threshold frequency range of the harmonic multiplier. For example, the contour tracer 204 may be configured with a specified range within which peaks must fall to be considered part of a harmonic contour. The contour tracer 204 may, for example, require peaks to be within 100 Hz of the base contour multiplied by the integer harmonic multiplier for the contour.

At block 510, the example harmonic noise reducer 106 selects a point with large amplitude among the points found within the threshold frequency range. For example, the contour tracer 204 may select the point with large amplitude among the points identified as within the threshold frequency range in order to begin a trace of a harmonic. In some examples, as with the standard contour tracing process of the contour tracer 204, the tracing of a harmonic begins at the point of largest amplitude. In other examples, a different point may be selected to begin the trace of the harmonic contour.

At block 512, the example harmonic noise reducer 106 generates a contour from the point of large amplitude. For example, the contour tracer 204 may generate the contour from the point with the largest overall amplitude. Detailed instructions to generate the contour from the point of large amplitude are provided in FIG. 4.

At block 514, the example harmonic noise reducer 106 determines if the contour meets the minimum length of time and maximum allowable time beyond end of base contour conditions. For example, the contour tracer 204 may determine if the harmonically related contour meets the minimum length of time and maximum allowable time beyond end of base contour conditions prior to committing the contour to a set of contours or to a permanent memory.

At block 516, the example harmonic noise reducer 106 saves the contour to a set of harmonic contours. For example, the contour tracer 204 may store the contour to a set of harmonic contours prior to storing the contour to the overall traced contour dataset. An example of harmonically related contours which may have been stored to a harmonic set, but are also shown in the overall traced contour dataset, are shown by the contour **902*b* or 902*c* in FIG. 9**.

At block 518, the example harmonic noise reducer 106 determines if the current harmonic multiplier which has been utilized to trace the most recent harmonic contour is equal to the set threshold. For example, the contour tracer 204 may be configured with a threshold for the maximum number of harmonic contours to trace. In response to the current harmonic multiplier being equal to the set threshold, processing returns to FIG. 3 and transfers to block 320. Conversely, in response to the current harmonic multiplier being below the set threshold, processing transfers to block 506.

Figure 6:
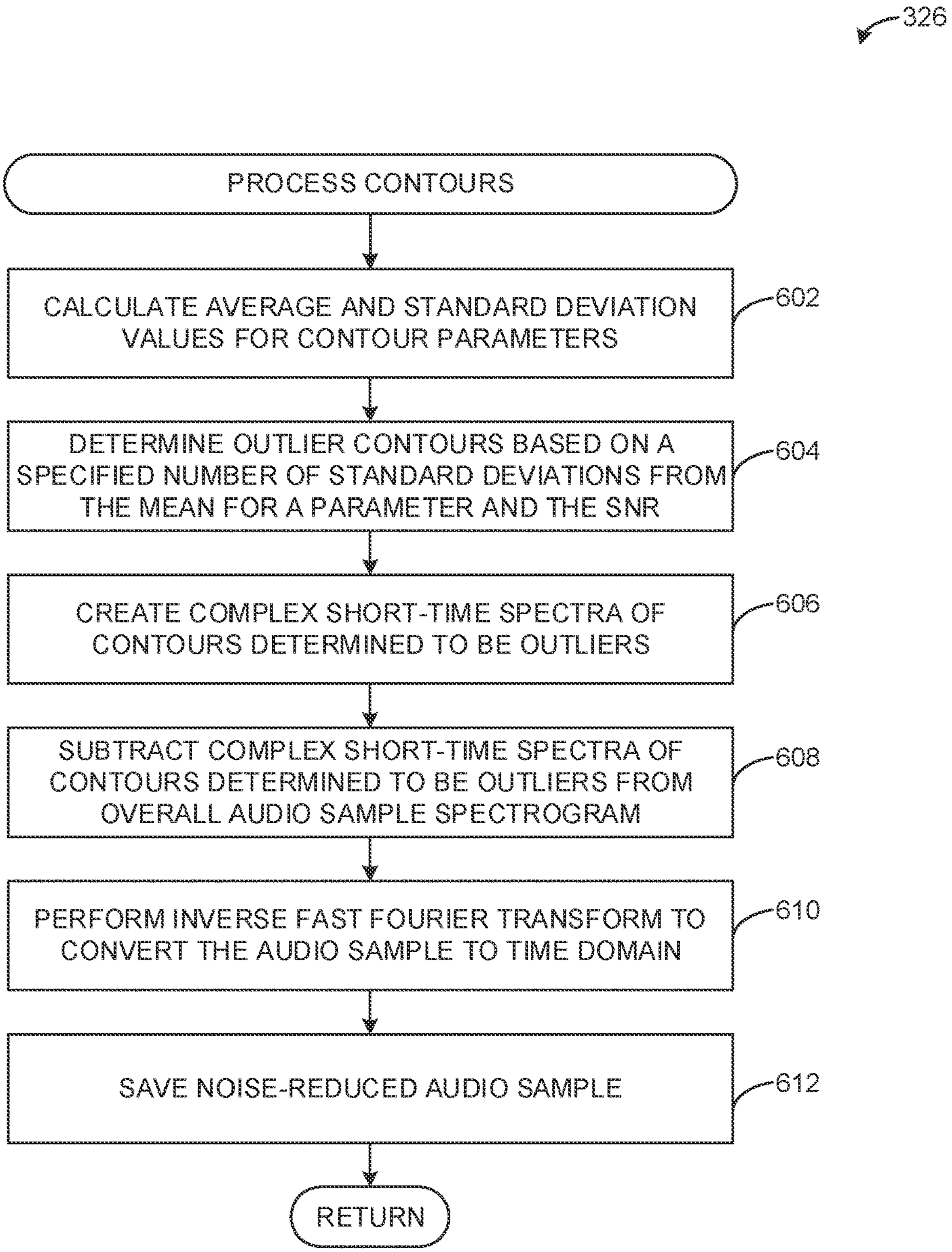

Example machine readable instructions 326 for implementing the harmonic noise reducer 106 of FIG. 2 and that may be executed to generate contour parameters, classify outliers and perform noise subtraction and synthesis of the audio signal are illustrated in FIG. 6. With reference to the preceding figures and associated descriptions, the example machine readable instructions 326 of FIG. 6 begin with the example harmonic noise reducer 106 calculating the average and standard deviation values for contour parameters (block 602). For example, the parameter calculator 206 may calculate the average amplitude value across all contours, as well as the standard deviation of the amplitude across all contours. In some examples, the parameter calculator 206 may determine the mean amplitude and/or standard deviation based on a set of contours excluding a percentage of fringe contours (e.g., the top 5% largest amplitude and bottom 5% smallest amplitude contours). Additionally or alternatively, the parameter calculator 206 may calculate the phase coherence, percentage of pitch movement, or any other parameter of the contours. In some examples, the parameter calculator 206 may be configured to calculate other parameters which may be useful in identifying a specific type of noise among the set of contours.

At block 604, the example harmonic noise reducer 106 determines outlier contours based on a specified number of standard deviations from the mean for a parameter and the signal to noise ratio (SNR). For example, the classifier 208 may determine outlier contours based on the contour having average amplitude that is beyond a threshold statistical distance from the mean and having a signal to noise ratio above the threshold minimum. For example, the classifier 208 may determine a contour to be an outlier based on having an amplitude that is five standard deviation's higher than the mean and a SNR above 40. In some examples, the classifier 208 may additionally determine all harmonics of an outlier contour to also be outlier contours. The example distribution of contours illustrated in FIG. 11 shows an implementation wherein the classifier 208 has been configured to identify outliers as having a minimum signal to noise ratio threshold of 40, and a minimum contour amplitude of 0.004 based on a specified number of standard deviations from the mean contour amplitude value. In this example, the 6 points in the gray-colored region 1106 would be determined to be outliers by the harmonic noise reducer 106. The contours corresponding to the pitch contours identified as outliers are further emphasized in the illustration of FIG. 12, pertaining to the same audio signal. The harmonics of these contours are then further identified as outliers and emphasized in the illustration of FIG. 13, pertaining to the same audio signal.

At block 606, the example harmonic noise reducer 106 creates complex short-time spectra of contours determined to be outliers. For example, the subtractor 210 may create a noise spectrum based on the contours determined to be outliers. In some examples, the outlier noise spectrum includes the contours at their full, observed amplitudes and all other frequency and phase combinations in the audio sample with zero amplitude. An example spectrum as generated by the subtractor 210 is illustrated in FIG. 14. As depicted, only those contours emphasized as outliers or harmonics of outliers in the illustration pertaining to the same audio signal in FIG. 13 are included in the example noise spectrum.

At block 608, the example harmonic noise reducer 106 subtracts the complex short-time spectra of contours determined to be outliers from the overall audio sample spectrogram. For example, the subtractor 210 may subtract the complex short-time spectra of contours determined to be outliers from the audio sample spectrogram, resulting in a noise-reduced spectrogram output, as shown in the illustrated example of FIG. 15. As shown in FIG. 15, the subtracted spectrum of FIG. 14 pertaining to the same audio sample has been removed from the spectrogram of FIG. 15.

At block 610, the example harmonic noise reducer 106 performs an inverse fast Fourier transform to convert the audio sample to the time domain. For example, the synthesizer 212 may perform an inverse fast Fourier transform and overlap add operation to convert the sample to the time domain. After this conversion, the audio sample is in the time domain, as it was prior to the noise reduction processing, and has reduced noise due to the harmonic noise removal.

At block 612, the example harmonic noise reducer 106 saves the noise-reduced audio sample. For example, the audio sample may be saved to the database 214. Alternatively, the audio sample may be saved to any location accessible by the harmonic noise reducer 106. In some examples, the noise-reduced audio sample may be transmitted to the central facility 110 with or without saving the audio sample to the database 214.

FIG. 7 is an example spectrogram of an audio sample that has been converted using a short time Fourier transform to the frequency domain. The spectrogram shows time and frequency on the axes of the spectrogram, with the amplitude of the signal indicated by the darkness of the lines. For example, the region 702 displays a dark section indicative of a large amplitude signal.

FIG. 8 is an example plot of the points of comparatively large amplitude (e.g., the instantaneous peaks) of the same audio signal of the spectrogram of FIG. 7. As in FIG. 8, the darker regions of the plot indicate the larger amplitude instantaneous peaks of the audio sample. For example, the region 802 displays a dark section indicative of points that have large amplitude. The point 804 within the region 802 indicates a point of comparatively large amplitude from which a contour may be traced.

FIG. 9 is an example traced contour plot of the traced contours for the same audio signal of FIGS. 7-8. The traced contour plot displays all of the contours that were traced until the stopping condition specifying the percentage of points of large amplitude which have been used to draw contours has been reached. In the traced contour plot, contours 902*a*, 902*b* and 902*c* include contours which appear to be harmonically related.

Figure 10:
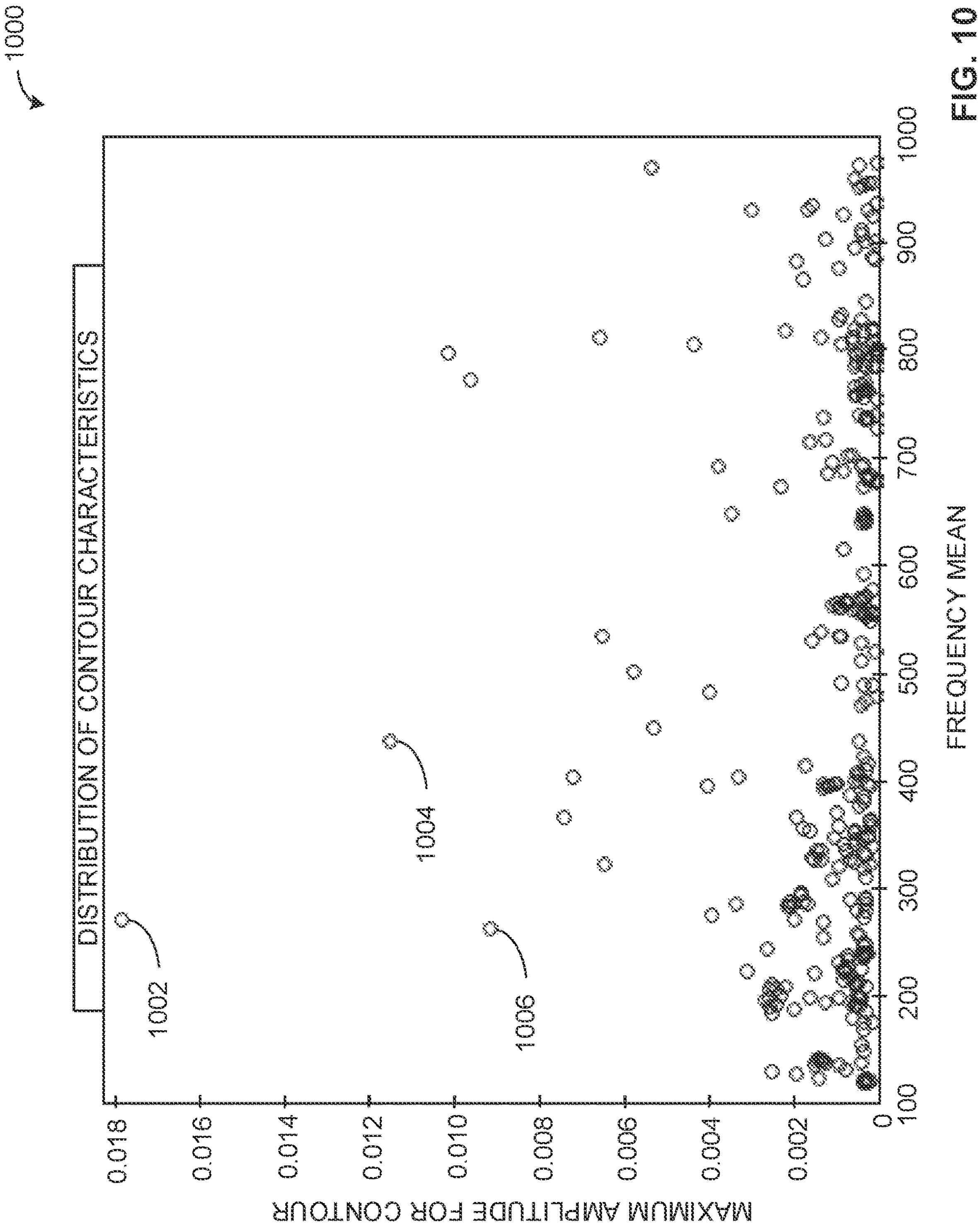
FIG. 10 is an example distribution of contour characteristics as generated by the parameter calculator of FIG. 2.

FIG. 10 is an example distribution of contour characteristics for the same audio sample of FIGS. 7-9, displaying all contours as a function of the frequency mean for the contour and maximum amplitude for the contour. Areas which appear darker include clusters of numerous contours with similar frequency means and maximum amplitudes. Conversely, individual points which have high amplitude may indicate outliers. For example, the point 1002 has the largest maximum amplitude for a contour, approximately 15 times larger than the mean amplitude for all contours. The point 1004 and the point 1006 also have large amplitudes. However, in some examples, these contours are not yet determined to be outliers on the basis of the maximum amplitude for the contour, but rather need to additionally consider the contour's signal to noise ratio as well.

FIG. 11 is an example distribution of contour characteristics for the same audio sample of FIGS. 7-10, displaying all contours as a function of the signal to noise ratio for the contour and the maximum amplitude of the contour. In this example illustration, the contours become significantly more clustered, mostly with relatively low signal to noise ratios and low amplitudes. Outliers are easily identified as contours which exceed both a minimum signal to noise ratio (approximately 40) and a minimum amplitude (approximately 0.004). Region 1104 includes contours which exceed the maximum contour amplitude requirement but do not have a large enough signal to noise ratio to be considered an outlier. For example, the point 1108 (corresponding to the same contour as the point 1002 of FIG. 10) and the point 1110 (corresponding to the same contour as the point 1004 of FIG. 10) are determined not to be outliers, despite having the two largest maximum amplitude values, due to the contours' low signal to noise ratios. Conversely, region 1102 includes contours which have a large signal to noise ratio but not a large enough maximum amplitude to be considered an outlier. Region 1106 includes contours which are determined, based upon the example requirements, to be outlier contours. The example point 1112 (corresponding to the same contour as the point 1006 of FIG. 10) has a maximum amplitude and signal to noise ratio which are both in excess of the thresholds and is determined to be an outlier.

FIG. 12 is an example illustration of the pitch contours which have been identified as outliers for the same audio sample of FIGS. 7-11. The darkened contours, such as the contour indicated by 1202 have been determined to be outliers based on the signal to noise ratio and maximum amplitude requirements.

FIG. 13 is an example illustration of the pitch contours which have been identified as outliers as well as the harmonics of these outliers for the same audio sample of FIGS. 7-12. Contour 1302*a* is an example of a base outlier contour, whereas 1302*b* and 1302*c* are examples of harmonic outlier contours.

FIG. 14 is an example illustration of the subtracted spectrum consisting of only the signal from the contours identified as outliers for the same audio sample of FIGS. 7-13. The subtracted spectrum is then able to be utilized to remove noise from the original spectrogram of the audio signal by subtracting these contours.

FIG. 15 is an example illustration of the noise-reduced spectrum for the same audio sample of FIGS. 7-14 after performing the subtraction of the subtracted spectrum of FIG. 14.

Figure 16:
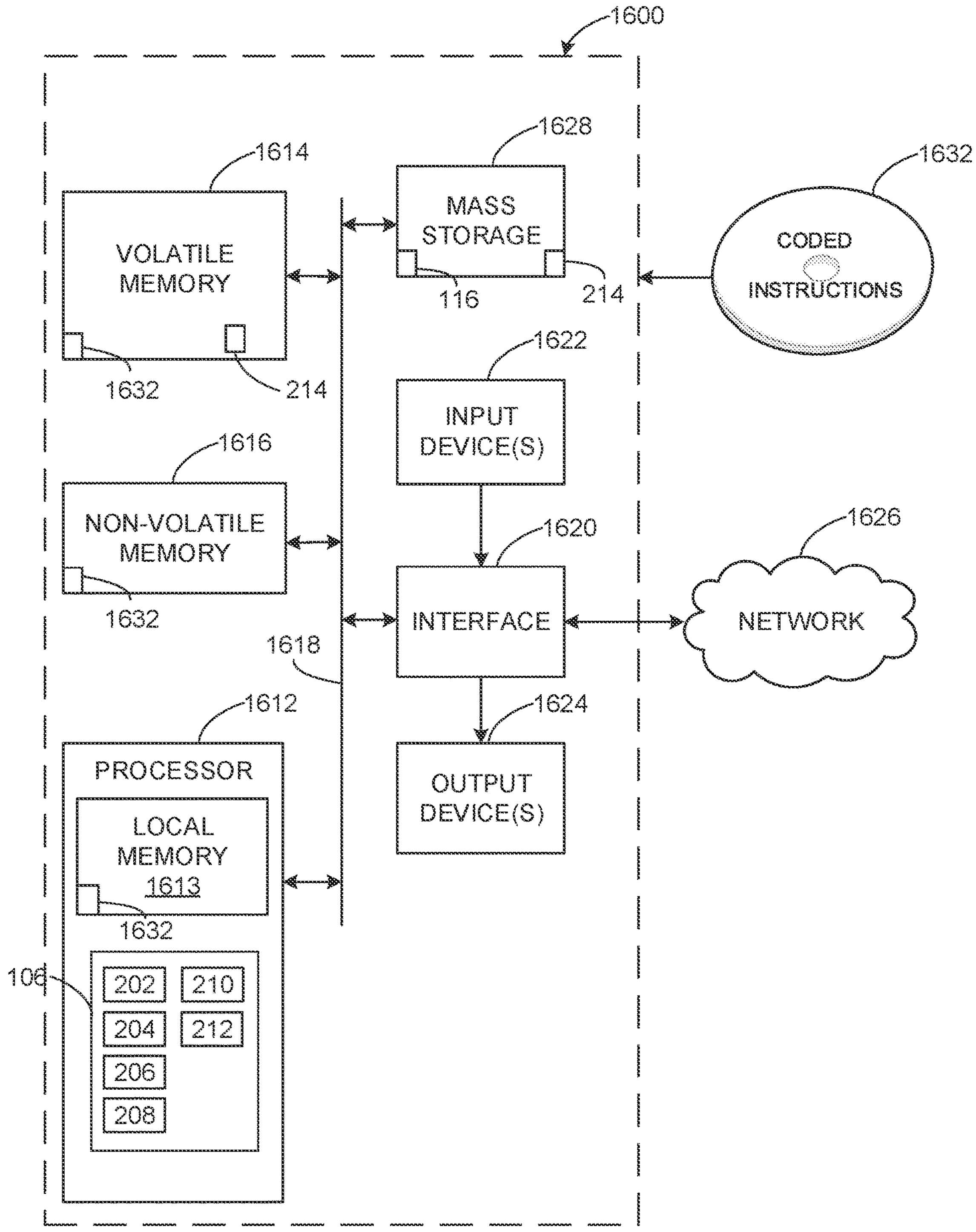
FIG. 16 is a schematic illustration of an example processor platform that may execute the instructions of FIGS. 3-6 to implement the example harmonic noise reducer of FIGS. 1 and 2.

FIG. 16 is a block diagram of an example processor platform 1000 capable of executing the instructions of FIGS. 3-6 to implement the harmonic noise reducer 106 of FIG. 2. The processor platform 1600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer. The hardware processor may be a semiconductor based (e.g., silicon based) device. In this example, the processor 1612 implements the example domain converter 202, the example contour tracer 204, the example parameter calculator 206, the example classifier 208, the example subtractor 210, the example synthesizer 212, and the example database 214.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a peripheral component interconnect (PCI) express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuit 1620 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and DVD drives.

The coded instructions 1632 of FIGS. 3-6 may be stored in the mass storage device 1628, in the volatile memory 1614, in the non-volatile memory 1616, and/or on a removable non-transitory computer readable storage medium such as a CD or DVD.

From the foregoing, it will be appreciated that example methods, apparatus and articles of manufacture have been disclosed that enable harmonic noise reduction of an audio signal for enhanced clarity of the audio signal. The techniques disclosed herein significantly reduce noise in an audio signal, especially when the noise has high energy characteristics and harmonics including a large signal to noise ratio and large amplitude signal. Further, the identification and reduction of harmonic contours representing noise on the basis of identified base contours with large amplitude features enables an efficient means of eliminating noise at multiple harmonic levels for the most noise reduction without the analysis of a large percentage of large-amplitude signal data points. The disclosed contour tracing techniques allow for highly targeted characterization of the most prominent features of the audio signal, thereby facilitating a noise reduction process that focuses on only critical features for applications such as audio signaturing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising computer readable instructions which, when executed, cause one or more processors to at least:

determine a first amplitude value in a frequency spectrum of an audio sample;

determine one or more points in the frequency spectrum having at least one of (a) a second amplitude value within an amplitude threshold of the first amplitude value, (b) a frequency value within a frequency threshold of the first amplitude value, or (c) a phase value within a phase threshold of the first amplitude value;

generate a contour trace, wherein the contour trace includes at least one of the determined first amplitude value and the determined one or more points;

based on the contour trace, modify the audio sample; and determine if the contour trace is an outlier based on a distance from a parameter of the contour trace.

2. The non-transitory computer readable storage medium of claim 1, wherein the contour trace is generated based on a distance between (1) the determined first amplitude value and (2) at least one of the determined one or more points satisfying a distance threshold.

3. The non-transitory computer readable storage medium of claim 2, wherein the distance threshold is satisfied when a complex distance between the first amplitude value and at least one of the determined one or more points is less than the distance threshold.

4. The non-transitory computer readable storage medium of claim 1, wherein the contour trace is generated by stepping forward and backward in time from the first amplitude value, and wherein the contour trace terminates when a counter threshold is satisfied.

5. The non-transitory computer readable storage medium of claim 4, wherein the counter threshold is satisfied when the counter threshold corresponds to a maximum number of successive time frames during which a point is not found with one or more of: (1) amplitude satisfying the amplitude threshold; (2) frequency satisfying the frequency threshold; and (3) phase satisfying the phase threshold, relative to another point of the contour trace.

6. The non-transitory computer readable storage medium of claim 1, further comprising computer readable instructions which, when executed, cause one or more processors to at least determine points of comparatively large amplitude for a representative number of frequencies in the audio sample and to generate contours for a specified percentage of the points of comparatively large amplitude in the audio sample.

7. The non-transitory computer readable storage medium of claim 1, wherein modifying the audio sample comprises removing the contour trace from the audio sample if the contour trace is an outlier.

8. The non-transitory computer readable storage medium of claim 1, further comprising computer readable instructions which, when executed, cause one or more processors to at least perform a short-time Fourier transform with a specified windowing length and window time frame on the audio sample.

9. An apparatus to reduce harmonic noise, the apparatus comprising:

at least one memory;

computer readable instructions in the apparatus;

processor circuitry to execute the computer readable instructions to at least:

determine a first amplitude value in a frequency spectrum of an audio sample;

determine one or more points in the frequency spectrum having at least one of (a) a second amplitude value within an amplitude threshold of the first amplitude value, (b) a frequency value within a frequency threshold of the first amplitude value, or (c) a phase value within a phase threshold of the first amplitude value;

generate a contour trace, wherein the contour trace includes at least one of the determined first amplitude value and the determined one or more points;

based on the contour trace, modify the audio sample; and determine if the contour trace is an outlier based on a distance from a parameter of the contour trace.

10. The apparatus of claim 9, wherein the contour trace is generated based on a distance between (1) the determined first amplitude value and (2) at least one of the determined one or more points satisfying a distance threshold.

11. The apparatus of claim 10, wherein the distance threshold is satisfied when a complex distance between the first amplitude value and at least one of the determined one or more points is less than the distance threshold.

12. The apparatus of claim 9, wherein generating the contour trace comprises stepping forward and backward in time from the first amplitude value, and wherein the contour trace terminates when a counter threshold is satisfied.

13. The apparatus of claim 12, wherein the counter threshold is satisfied when the counter threshold corresponds to a maximum number of successive time frames during which a point is not found with amplitude satisfying the amplitude threshold, frequency satisfying the frequency threshold, and phase satisfying the phase threshold relative to another point of the contour trace.

14. The apparatus of claim 9, wherein the processor circuitry further executes computer readable instructions to at least determine points of comparatively large amplitude for a representative number of frequencies in the audio sample and to generate contours for a specified percentage of the points of comparatively large amplitude in the audio sample.

15. The apparatus of claim 9, wherein modifying the audio sample comprises removing the contour trace from the audio sample if the contour trace is an outlier.

16. The apparatus of claim 9, wherein the processor circuitry further executes computer readable instructions to at least perform a short-time Fourier transform with a specified windowing length and window time frame on the audio sample.

17. A method to reduce noise from harmonic noise sources, wherein the method comprises:

determining a first amplitude value in a frequency spectrum of an audio sample;

determining one or more points in the frequency spectrum having at least one of (a) a second amplitude value within an amplitude threshold of the first amplitude value, (b) a frequency value within a frequency threshold of the first amplitude value, or (c) a phase value within a phase threshold of the first amplitude value;

generating a contour trace, wherein the contour trace includes at least one of the determined first amplitude value and the determined one or more points; and based on the contour trace, modifying the audio sample; and determining if the contour trace is an outlier based on a distance from a parameter of the contour trace.

18. The method of claim 17, wherein the method further comprises determining if the contour trace is an outlier based on a distance from a parameter of the contour trace, and wherein modifying the audio sample comprises removing the contour trace from the audio sample if the contour trace is an outlier.

19. The method of claim 17, wherein the contour trace is generated based on a distance between (1) the determined first amplitude value and (2) at least one of the determined one or more points satisfying a distance threshold.

20. The method of claim 19, wherein the distance threshold is satisfied when a complex distance between the first amplitude value and at least one of the determined one or more points is less than the distance threshold.

* * * * *